United States Patent [19]
Whitlock

[11] Patent Number: 5,992,518
[45] Date of Patent: Nov. 30, 1999

[54] FILTER FOR SUBTERRANEAN USE

[75] Inventor: Michael B. Whitlock, Cortland, N.Y.

[73] Assignee: Oiltools International B.V., Amsterdam, Netherlands

[21] Appl. No.: 08/848,490

[22] Filed: May 8, 1997

Related U.S. Application Data

[60] Provisional application No. 60/017,089, May 9, 1996.

[51] Int. Cl.⁶ ........................................... E03B 3/18
[52] U.S. Cl. ..................... 166/235; 166/236; 210/458
[58] Field of Search ........................ 166/227, 233, 166/235, 236; 210/458, 500.25, 509

[56] References Cited

U.S. PATENT DOCUMENTS

| | | |
|---|---|---|
| 1,341,755 | 6/1920 | Minton . |
| 2,364,191 | 12/1944 | Campbell ................................ 155/94 |
| 3,106,526 | 10/1963 | Schmidt ................................ 166/235 |
| 3,275,081 | 9/1966 | Beylik ................................ 166/235 X |
| 4,167,972 | 9/1979 | Sears ................................ 166/233 |
| 4,284,138 | 8/1981 | Allred ................................ 166/233 |
| 4,378,840 | 4/1983 | Lilly ................................ 166/233 |
| 4,411,788 | 10/1983 | Kimura ................................ 210/439 |
| 4,483,396 | 11/1984 | Kennelly ................................ 166/242 |
| 4,778,008 | 10/1988 | Gonzalez et al. ................................ 166/387 |
| 5,333,688 | 8/1994 | Jones et al. ................................ 166/235 X |
| 5,664,628 | 9/1997 | Koehler et al. ................................ 166/369 |
| 5,673,752 | 10/1997 | Scudder et al. ................................ 166/369 X |

FOREIGN PATENT DOCUMENTS

| | | |
|---|---|---|
| 0126318 | 11/1984 | European Pat. Off. . |
| 0783074 | 7/1997 | European Pat. Off. . |
| WO 9618022 | 6/1996 | WIPO . |

*Primary Examiner*—Roger Schoeppel
*Attorney, Agent, or Firm*—Leydig, Voit & Mayer, Ltd.

[57] ABSTRACT

A filter for subterranean environments includes an inner support member, a filter body containing a filter medium disposed around the inner support member, and at least one end connector connected to a lengthwise end of the filter body and sealed against the inner support member without being welded to the inner support member. The end connector may be restrained from movement relative to the inner support member in a lengthwise direction of the inner support member, without being welded to the inner support member, to resist axial forces acting on the filter during installation or operation in a well. Alternatively, the end connector may be capable of movement with respect to the inner support member in a lengthwise direction of the inner support member to enable the filter to undergo thermal expansion without damage to the filter body or other portions of the filter.

76 Claims, 10 Drawing Sheets

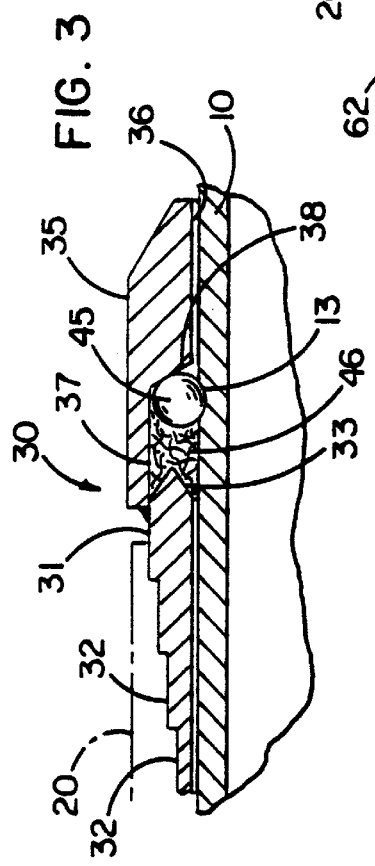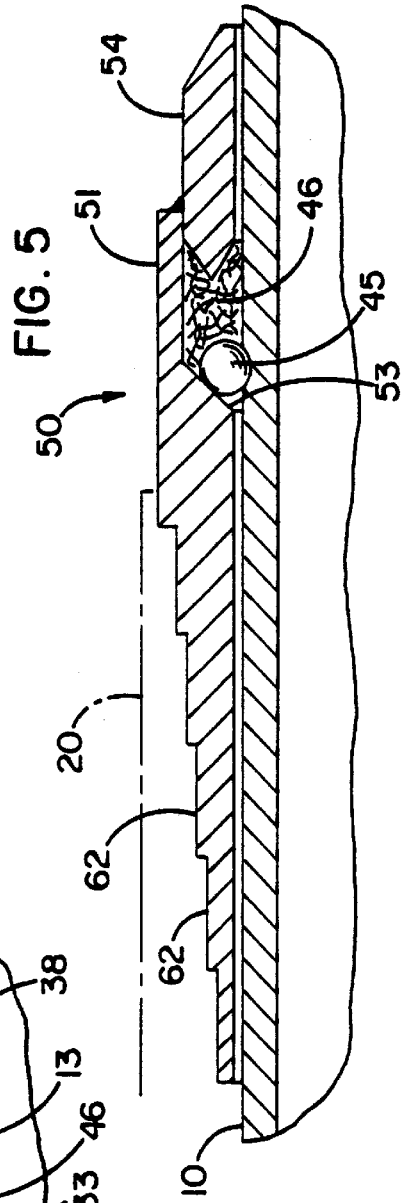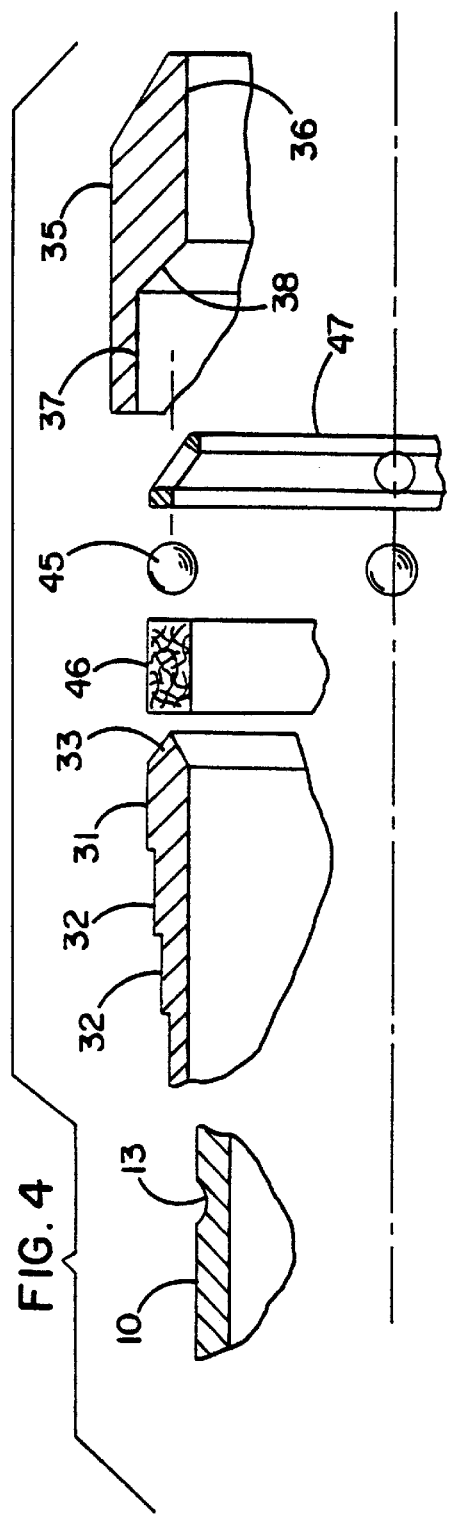

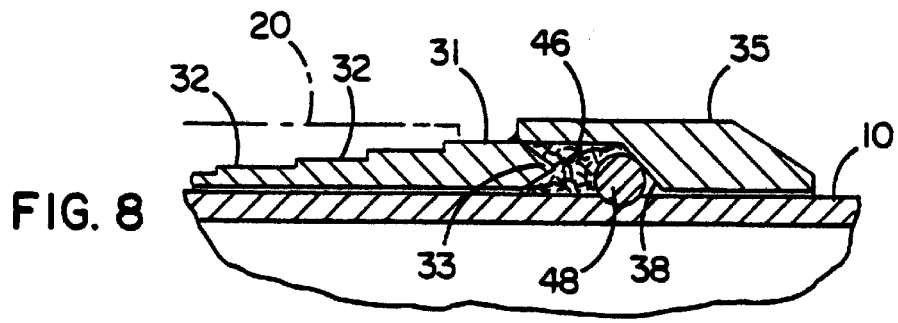
FIG. 8
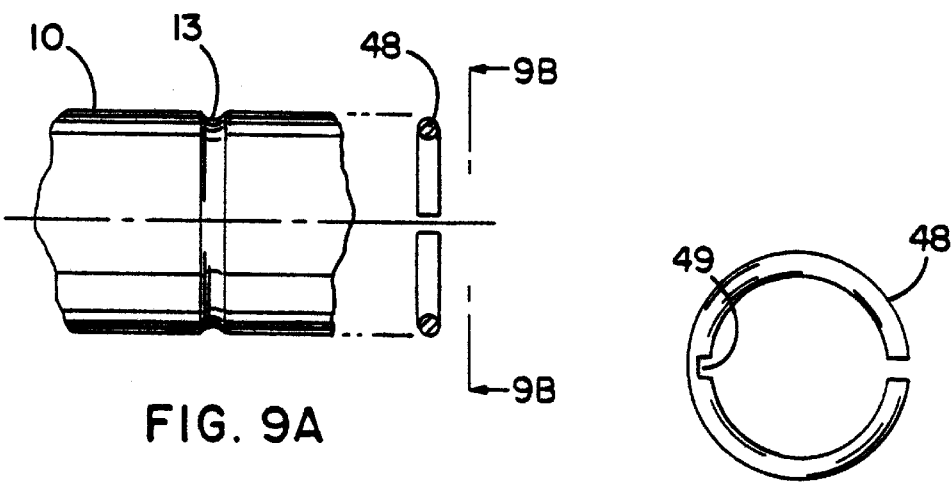
FIG. 9A
FIG. 9B
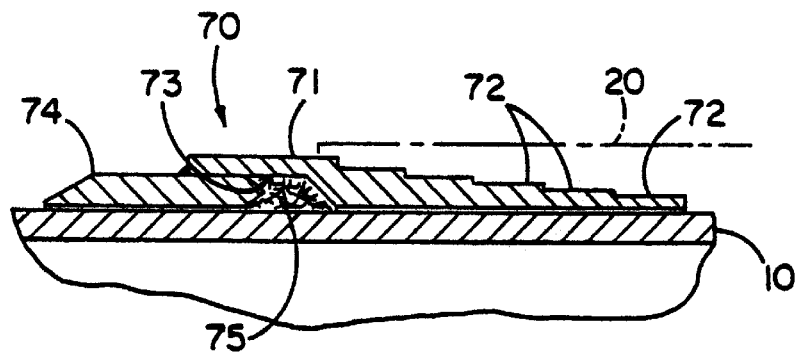
FIG. 10

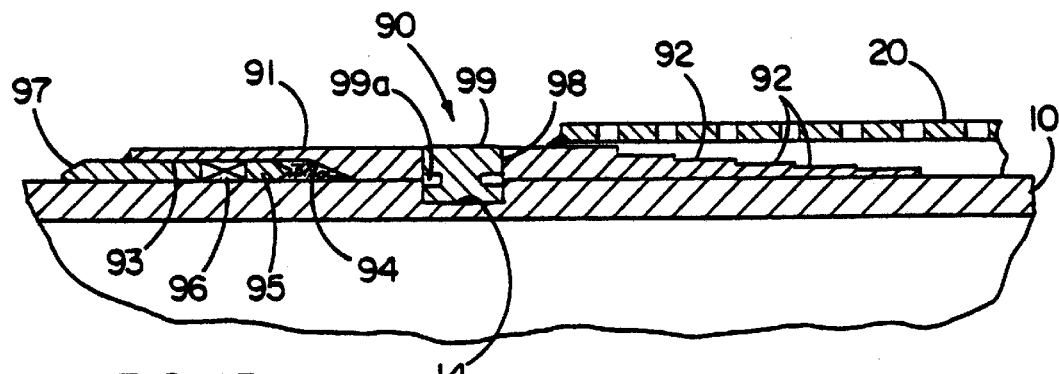
FIG. 15
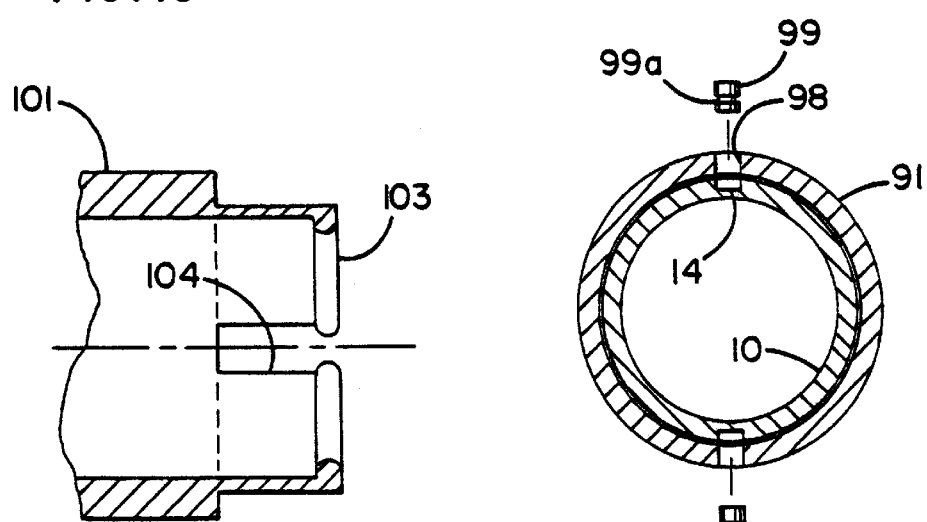
FIG. 18
FIG. 16
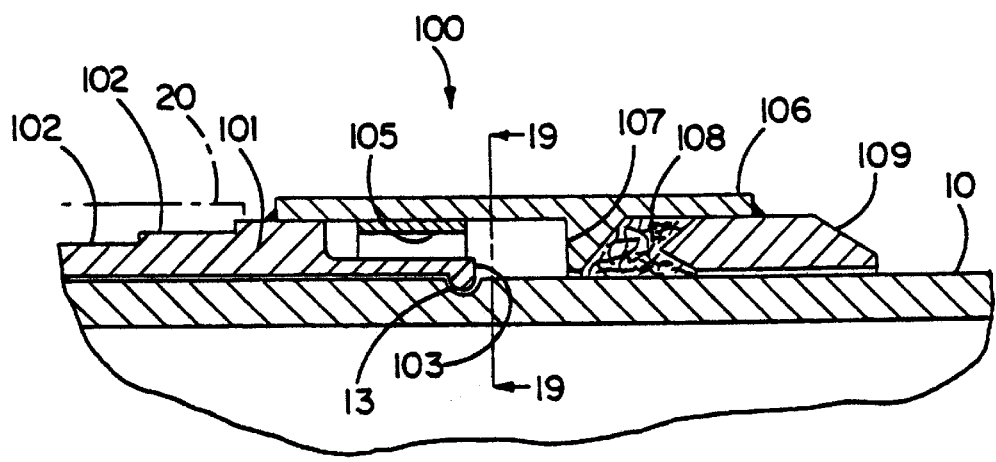
FIG. 17

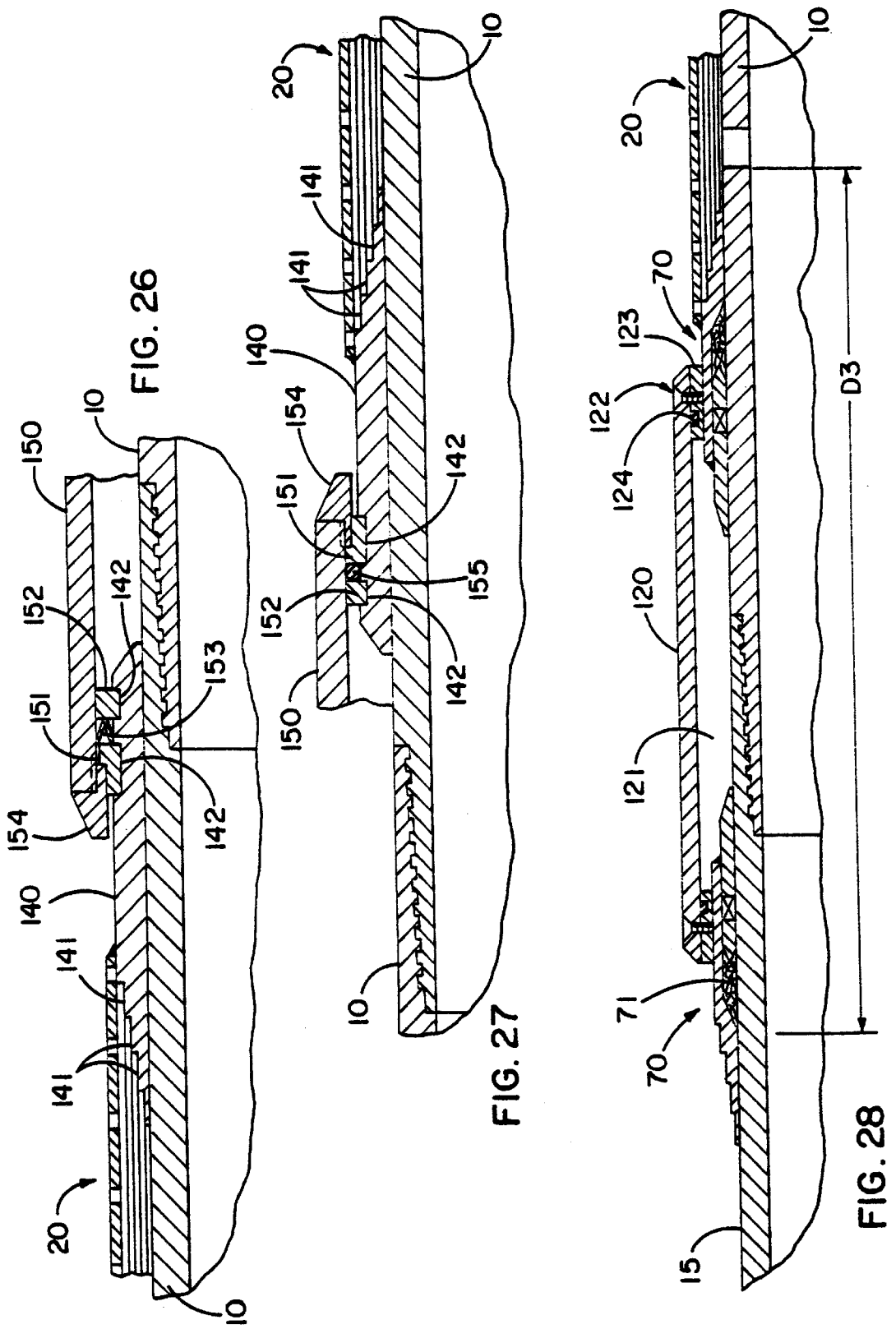

FILTER FOR SUBTERRANEAN USE

REFERENCE TO RELATED APPLICATIONS

This application claims the benefit of U.S. Provisional Application No. 60/017,089 filed on May 9, 1996.

BACKGROUND OF THE INVENTION

1. Field of the Invention

This invention relates generally to filters for use in subterranean environments, such as in oil and gas wells, water wells, and geothermal wells, and in other applications in which it is desired to remove a liquid or gas from the ground without bringing soil particulates, such as sand or clay, up with the liquid or gas. In particular, it relates to a filter having improved end connectors for sealing the ends of the filter.

2. Description of the Related Art

Filters are frequently used in subterranean wells in order to remove particulates from liquids or gases produced by the wells. Typical particulates which need to be filtered out are sand and clay, and for this reason, well filters for this purpose are often referred to as sand screens.

A well filter typically comprises a filter body mounted on the exterior of a pipe or other tubular support member. The filter is generally installed in series with a plurality of pipes forming a pipe string, and the filter is introduced into the well along with the pipe string. For example, in the case of an oil or gas well, the pipe string is a production string through which oil or gas is transported from a production zone within the well to the exterior of the well. When a pipe string containing the filter is being inserted into a well, the filter may come into contact with and catch on objects within the well bore. To prevent the filter body from sliding along the inner support member when such contact takes place, it is desirable to provide some restraint to lengthwise movement by the filter body. One method of restraint is to secure the filter body to annular metal end connector and to weld the end connectors to the inner support member. However, the inner support member of the filter is frequently a standard API grade of production pipe, which is normally made of a medium to high carbon grade of steel, whereas it may be desirable from the standpoint of corrosion resistance for the end connectors and filter body to be made of a different metal, such as austenitic stainless steel. It is notoriously difficult to weld steel with carbon contents of 0.20% and higher without causing hard spots, especially in the heat affected zone (HAZ), thus sacrificing corrosion resistance and sometimes impact properties of the base metal. Thus, there is a need for a well filter in which end connectors can be reliably secured to an inner support member, such as an API production pipe, without employing welding.

In some wells, such as geothermal wells, a well filter may be subjected to elevated temperatures during use and may undergo significant thermal expansion with respect to its dimensions when it is assembled. When the inner support member and the filter body of a well filter have different thermal expansion coefficients, or when the inner support member and the filter body are heated to different temperatures from each other, the difference in the amount of thermal expansion of the inner support member and the filter body may cause the filter body to be torn loose from the inner support member, allowing unfiltered fluids to bypass the filter body. Therefore, although it is desirable to prevent lengthwise movement of the filter body with respect to the inner support member during installation of the filter in a well, after the filter has been installed, it is desirable to enable relative lengthwise movement between the filter body and the inner support member when thermal expansion takes place.

SUMMARY OF THE INVENTION

The present invention provides a filter for use in subterranean environments having a filter body and end connectors for connecting the filter body to a support member of the filter without welding.

The present invention also provides a filter for use in subterranean environments which can undergo thermal expansion without damage to its structural integrity.

The present invention additionally provides a method of forming a filter having nonwelded end connectors.

A filter according to the present invention includes an inner support member, a filter body disposed around the inner support member and including a filter medium, and at least one end connector connected to a lengthwise end of the filter body. The end connector is sealed against the inner support member, without being welded to the inner support member, so as to prevent particles small enough to be removed by the filter body from flowing between the end connector and the inner support member and bypassing the filter body. In preferred embodiments, the filter includes two end connectors disposed at opposite lengthwise ends of the filter body, neither of the end connectors being welded to the inner support member.

The end connector may be either rigidly secured to the inner support member to resist axial forces acting on the filter during installation or operation in a well, or the end connector may be capable of movement relative to the inner support member in a lengthwise direction of the inner support member to enable the filter to undergo thermal expansion without damage to the filter body or other portions of the filter. A movable end connector may be movable relative to the inner support member in a single lengthwise direction or in two lengthwise directions. It may be movable with respect to the inner support member in response to relatively low axial forces, or it may be rigidly connected to the inner support member up to a predetermined axial force, above which force relative movement of the end connector and the inner support member can take place.

Because the end connectors of a filter according to the present invention can be connected to an inner support member without welding, a wider choice of materials can be used to form the filter than when welding required. Furthermore, deformation and degradation of the properties of the inner support member due to the heat of welding can be avoided, so the strength of the filter can be increased.

A filter according to the present invention can be employed in any desired manner in a wide variety of underground environments, such as in oil or gas wells, water wells, geothermal wells, groundwater remediation wells, and leaching ponds. For example, the filter can be used in cased hole gravel pack completion in which the filter is disposed inside a gravel pack in the production zone of an oil or gas well, in an open hole gravel pack in which the filter is disposed in a gravel pack without being surrounded by casing, in filtration without a gravel pack, in open hole completion in which the filter is introduced into a well as part of a well string and the formation surrounding the well bore is allowed to fall in on the filter, in slim hole completion in which the filter is installed in a drill string and left in the well with the drill string at the completion of drilling, in coiled tubing completions and workovers in which the filter is connected to coiled tubing, with wire-line in which the filter is lowered into a well by wire-line and sealed in place in the well, for pump protection in which the filter is installed on or upstream of the inlet of a subsurface pump, in ground remediation in which underground fluids are brought to the surface via the well or compressed air is passed through the filter to form air bubbles and perform air sparging, and in leaching ponds for filtering ion-containing liquids which leach from ores in the pond. Details of the manner of using the filter in these and other environments are described in U.S. patent application Ser. No. 08/351,658 now U.S Pat. No. 5,664,628 and International Application No. PCT/US95/15988, which are incorporated by reference.

BRIEF DESCRIPTION OF THE DRAWINGS

FIG. 3 is an enlarged cross-sectional view of the right end connector of FIG. 2.

FIG. 4 is an exploded view of the end connector of FIG. 3.

FIG. 5 is a longitudinal cross-sectional view of a variation of the end connector of FIG. 3.

FIG. 8 is a longitudinal cross-sectional view of a variation of the end connector of FIG. 3 employing a split ring as a stopping member.

FIG. 9A is a partially cross-sectional exploded view of the inner support member and the split ring of the end connector of FIG. 8, and FIG. 9B is a side view of the split ring of FIG. 9A.

FIG. 10 is an enlarged cross-sectional view of the left end connector of the embodiment of FIG. 2.

FIG. 15 is a longitudinal cross-sectional view of an end connector secured to an inner support member by shear pins.

FIG. 16 is a transverse cross-sectional view of the end connector of FIG. 15.

FIG. 17 is a longitudinal cross-sectional view of another end connector for use in the present invention.

FIG. 18 is a longitudinal cross-sectional view of the first sleeve of the end connector of FIG. 17.

FIG. 24 is a longitudinal cross-sectional view of one end of another example of a joiner sleeve.

FIG. 25 is an exploded cross-sectional view of the joiner sleeve of FIG. 24.

FIGS. 26 and 27 are longitudinal cross-sectional view of the lengthwise ends of other examples of joiner sleeves.

FIG. 28 is a longitudinal cross-sectional view of a joiner sleeve having an upper end connected to a sleeve slidably mounted on a pipe string.

DESCRIPTION OF PREFERRED EMBODIMENTS

Figure 1:
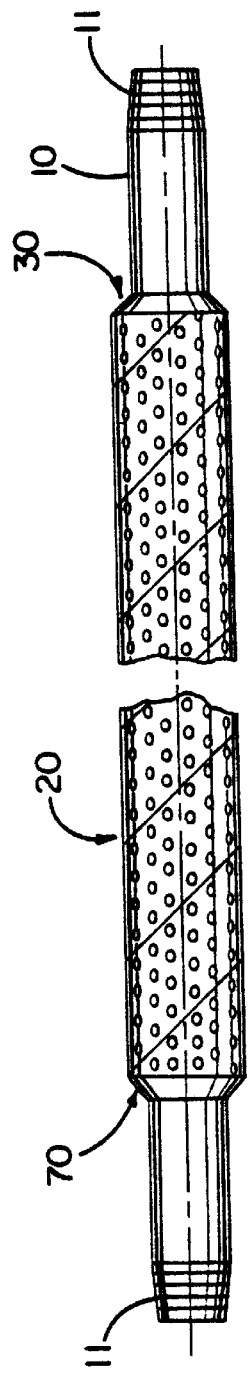
FIG. 1 is a plan view of an embodiment of a filter according to the present invention.

FIG. 1 illustrates an embodiment of a filter according to the present invention. The illustrated filter is intended for use within an oil or gas well to remove sand and other particulates from a fluid produced by the well, but as stated above, a filter according to the present invention can be used in a wide variety of applications and is not limited to use in a specific type of well.

The filter includes an inner support member 10, a filter body 20 disposed around the inner support member 10 and including a filter medium, and an end connector 30 and 70 disposed at each lengthwise end of the filter body 20 and connecting the filter body 20 to the inner support member 10 in a manner preventing particulates from bypassing the filter body 20.

This embodiment is intended to be connected in series with a pipe string which is inserted into a well. The filter can be installed at any desired location in the string, but usually it will be positioned near the bottom end of the string. The string may include one or more of the filters, either connected directly with one another or separated by a length of pipe or other members. The filter can be deployed vertically, horizontally, or at any other angle within a well.

The inner support member 10 provides rigidity to the filter and serves to axially transport filtrate which has passed through the filter body 20 to an unillustrated conduit (such as a pipe string) connected to the inner support member 10 for transporting the filtrate outside the well. Usually, the inner support member 10 is a hollow, tubular member and has perforations, pores, or other openings in its peripheral wall which permit fluid to flow into the hollow center of the inner support member 10, but the inner support member 10 need not be hollow as long as it is capable of transporting filtrate. For example, it may be a solid, porous member through which filtrate can flow axially, or it may be a solid member having axial channels in its outer surface for the transport of fluid. For reasons of strength, it is usually cylindrical, but other shapes may be employed, such as a shape with a polygonal or oval cross section, and the cross section may vary along its length. In the present embodiment, the inner support member 10 comprises a cylindrical pipe having a uniform cross section over most of its length and having perforations 12 for filtrate formed over a portion of its length in a region on which the filter body 20 is mounted. The inner support member 10 may be equipped with connecting portions at one or both of its ends to enable the inner support member 10 to be connected to other members. In FIG. 1, the inner support member 10 has an externally threaded pin 11 formed at each lengthwise end which can be screwed into an internally threaded box of a pipe or into a standard pipe connector for joining the pins of two pipes. When the filter is intended to be connected in series with a string of production pipe, a perforated production pipe is particularly suitable as the inner support member 10, since the threaded connectors of the production pipe will have the same strength as that of the connectors of the pipe string to which the filter is to be connected. If the inner support member 10 is expected to be subjected to only low tensile, torsional, or radial compressive forces, light-weight lockseam tubing or polymeric tubing may be employed for the inner support member 10. If the filter is to be installed at the tail end of a pipe string or other conduit, the lower end of the inner support member 10 may be closed off with a bull plug or similar member.

The inner support member 10 can be made of any material capable of withstanding the conditions to which the inner support member 10 is to be subjected during installation and use. When the inner support member 10 is formed from a length of production pipe (commonly referred to as a pipe joint), it will typically be made of steel.

The length of the inner support member 10 is not critical, and one or more filter bodies 20 can be mounted on a single inner support member 10. Members other than a filter body 20 and end connectors 30 and 70 can also be mounted on the inner support member 10, such as collars or conventional centralizers for guiding the filter as it is inserted into a well bore.

The filter body 20 contains a filter medium which filters a well fluid to form a filtrate. The filter body 20 may have any structure capable of performing the intended removal of substances from the fluid being filtered. For example, it may be a prepacked body, a wire-wrapped body, a sintered metal unitary body, a wire mesh body, or any other type of filter body. For this reason, the filter body 20 is shown only schematically in the drawings.

The filter body 20 need not have any particular shape. Usually, it will have an inner periphery which is similar in shape to the outer periphery of the inner support member 10, and its outer periphery will usually be rounded (such as cylindrical) to make it easier for the filter body 20 to pass through well casing.

In most applications, fluid will normally flow radially inward through the filter body 20 during filtration. However, in some applications, such as acidizing of a well, air sparging, water injection, and enhanced oil recovery applications, fluid may be directed radially outwards through the filter body 20.

Examples of filter bodies which are particularly suitable for use in wells for oil and gas and in other subterranean environments and which can be used in the present invention are disclosed in U.S. patent application Ser. No. 08/351,658. The filter bodies described in that application include a supported porous medium, which is a filter medium including a foraminate support member, such as a mesh, and particulates sintered to the foraminate support. A supported porous medium provides a filter having excellent damage resistance, meaning that the filter substantially retains its filtering integrity even when significantly deformed. An example of a supported porous medium for use in the present invention is a sintered supported porous metal sheet material disclosed in U.S. Pat. No. 4,613,369. This material, which is available from Pall Corporation under the trademark PMM®, can be manufactured from a wide variety of metals, such as nickel, iron, chromium, copper, molybdenum, tungsten, zinc, tin, aluminum, cobalt, iron, and magnesium, as well as combinations of metals and metal alloys including boron-containing alloys. For a filter intended for use in a well for oil or gas, nickel/chromium alloys are particularly suitable. Of these, AISI designated stainless steels which contain nickel, chromium and iron are particularly preferred.

In addition to some type of filter medium, the filter body 20 may include a variety of other layers and components, such as drainage layers to assist the flow of fluid into the filter medium and the flow of filtrate into the inner support member, cushioning layers to prevent abrasion of the filter medium, diffusion layers placed between layers of filter medium to permit edgewise flow of fluid, layers for selectively blocking flow through portions of the filter body, and a protective member, such as an outer cage or wrap, for protecting the filter body from erosion and damage. The structure and use of these and other components of a filter body are well known to those skilled in the art.

The end connectors 30, 70 serve to connect the filter body 20 to the inner support member 10 in a manner which prevents particulate matter large enough to be removed by the filter body 20 from bypassing the filter body 20 and flowing into the inner support member 10. In applications in which it is expected that axial forces may be applied to the filter body 20 during installation of the filter in a well, at least one of the end connectors is preferably capable of resisting these forces to prevent the filter body 20 from sliding along the inner support member 10 under the applied forces. Conversely, in applications in which the filter body 20 is expected to be subject to thermal strain (either expansion or contraction) different from that of the inner support member 10, at least one of the end connectors is preferably capable of lengthwise movement relative to the inner support member 10 to permit the thermal strain to take place without damage to the filter body 20. It is not necessary for both end connectors to have the same characteristics in order for the filter as a whole to resist the application of axial forces on the filter body 20 or to permit the filter body 20 and the inner support member 10 to expand or contract at different rates. For example, one end connector can be rigidly connected to the inner support member 10 to resist external axial forces, while the other end connector can be slidably connected to the inner support member 10 to permit relative movement of the inner support member 10 and the filter body 20 during thermal expansion. If the filter is not expected to undergo any significant thermal expansion, or if there is not expected to be any significant difference between the thermal strain of the filter body 20 and that of the inner support member 10, both of the end connectors may be connected to the inner support member 10 in a manner preventing lengthwise movement of the end connectors relative to the inner support member 10. In addition, if the end connectors are not expected to be subjected to any significant external axial forces, both of the end connectors may be capable of lengthwise movement relative to the inner support member 10. Thus, the two end connectors may be of the same or different structure.

Figure 2:
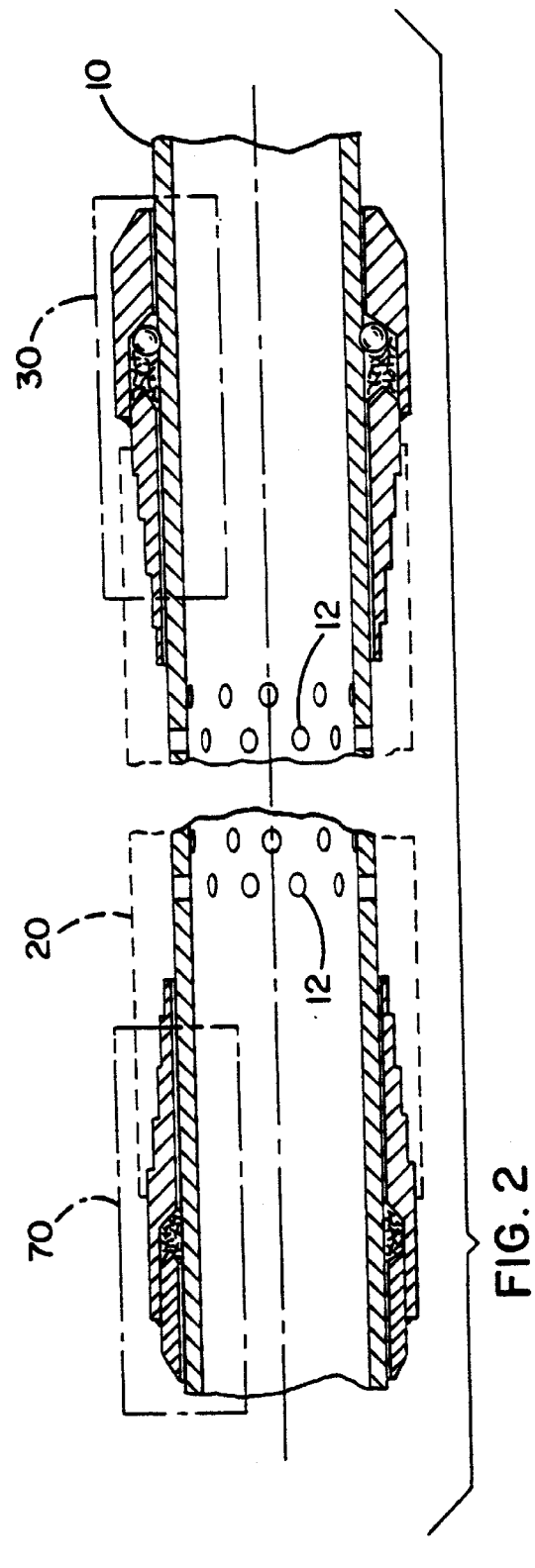
FIG. 2 is a longitudinal cross-sectional view of the longitudinal portions of the filter body of the embodiment of FIG. 1.

FIG. 2 is a longitudinal cross-sectional view of the lengthwise ends of the filter body 20 and the end connectors 30, 70 of the embodiment of FIG. 1. In this embodiment, one end connector (the right end connector 30 in the figure) is able to resist axial forces applied in either lengthwise direction of the inner support member 10, while the other end connector (the left end connector 70) does not provide any substantial resistance to axial forces in either direction. When a filter according to the present invention is inserted into a well, axial forces are more likely to be applied directly to the end connector at the lower end of the filter body 20 (the lower end connector) than to the end connector at the upper end of the filter body 20 (the upper end connector), and these axial forces are more likely to be upwards than downwards. Therefore, the filter of FIG. 2 will typically be installed in a well such that the right end connector 30 of FIG. 2 is at the lower end of the filter body 20. When the filter is being installed in this manner in a well, if the right end connector 30 strikes against an object, the right end connector 30 can directly resist an upward or downward axial force applied to it and prevent lengthwise movement of the filter body 20 relative to the inner support member 10. The left end connector 70 is not capable of directly resisting either an upward or downward axial force applied to it, but if the filter body 20 is sufficiently strong, axial forces applied to the left end connector 70 can be transmitted by the filter body 20 to the right end connector 30, which can resist these forces.

The end connectors 30, 70 need not have any particular shape. Preferably, they have an outer periphery which is generally round, such as circular, so that there are no sharp corners which can catch on external objects as the filter is being introduced into a well.

There is no particular restriction on the materials of which the end connectors 30, 70 are made. They can be made of a wide variety of materials including but not limited to metals, ceramics, and polymeric materials. The same applies to other embodiments of end connectors according to the present invention, to be described below. When the filter is to be employed in a well for oil or gas, a corrosion resistant metal which is compatible with the filter body 20 and can be sealingly connected to the filter body 20 is suitable. For example, when the filter body 20 is of the type disclosed in U.S. patent application Ser. No. 08/351,658 containing various wrapped layers formed from stainless steel, stainless steel is particularly suitable for use in forming the end connectors 30, 70 so that the end connectors can be readily joined to the filter body 20.

One end of each end connector 30, 70 is connected to a lengthwise end of the filter body 20 in a manner which prevents particles large enough to be removed by the filter body 20 from leaking through the connection between the end connector and the filter body 20. The end connectors and the filter body 20 may be connected with each other by any method suited to the materials employed for the end connectors and the filter body 20, such as welding, brazing, sintering, adhesive bonding, or a mechanical sealing method such as swaging, crimping, or an interference fit.

The end connectors 30, 70 may overlap in the lengthwise direction of the inner support member 10 the perforations 12 formed in the inner support member 10, but it may be desirable if there is a space between the inner lengthwise ends of the end connectors 30, 70 and the outer lengthwise ends of the region of the inner support member 10 in which the perforations 12 are formed. For example, in the present embodiment, there is a lengthwise gap of approximately 2 inches between the inner lengthwise ends of the end connectors 30 and 70 and the perforations 12 closest to the lengthwise ends of the inner support member 10. If a lengthwise end of the filter body 20 should become detached from one of the end connectors due to abnormal stresses, the presence of this gap in which no perforations 12 are formed will reduce the amount of unfiltered fluid which can flow through the perforations 12 compared to a structure in which the perforations 12 immediately adjoin or overlap the end connectors 30, 70 in the lengthwise direction.

FIG. 3 is an enlarged longitudinal cross-sectional view of the right end connector 30 in FIG. 2, and FIG. 4 is an exploded view of the end connector 30 of FIG. 3. This end connector 30 includes first and second sleeves 31 and 35 surrounding the inner support member 10, a sealing member 46 forming a seal against the outer surface of the inner support member 10, and one or more stopping members 45 for preventing or limiting movement of the sleeves in first and second lengthwise directions of the inner support member 10. Each sleeve has a generally axially facing stopping surface, and the stopping member 45 lies in the path of lengthwise movement of the stopping surfaces.

The sleeves 31 and 35 need not have any particular shape. Preferably, they have an outer periphery which is generally round and an inner periphery with a shape similar to the outer periphery of the inner support member 10. In the present embodiment, each sleeve has a generally cylindrical outer periphery and a generally circular bore extending along the axial center of the sleeve.

The inner lengthwise end of the first sleeve 31 (the left end in FIG. 3) is welded to a lengthwise end of the filter body 20 in a manner preventing particles large enough to be removed by the filter body 20 from passing through the welded connection. This end of the first sleeve 31 may be shaped to make it easier to join it to the filter body 20. For example, when the filter body 20 contains a plurality of discrete, concentric layers, as in the filter disclosed in U.S. patent application Ser. No. 08/351,658, the inner lengthwise end of the first sleeve 31 may be formed with annular steps 32 for supporting the individual layers. A method of welding such a filter body 20 to an end connector is described in detail in that application.

A stopping surface 32 is formed on the outer lengthwise end (the end remote from the filter body 20) of the first sleeve 31, and this surface is pressed against the sealing member 46. The first sleeve 31 may fit tightly around the inner support member 10, but preferably there is a loose fit between the two to make it easier to install the first sleeve 31 on the inner support member 10.

The second sleeve 35 has a central bore extending in the lengthwise direction of the sleeve. The bore has a first cylindrical region 36 which surrounds the inner support member 10 and a second cylindrical region 37 which is coaxial with the first region 36 and overlaps the outer periphery of the first sleeve 31 and has a larger inner diameter than the first region 36. Between the first and second regions 36 and 37 is a frustoconical stopping surface 38 which increases in diameter from the first region 36 to the second region 37. As is the case with the first sleeve 31, the bore of the second sleeve 35 preferably fits loosely around the inner support member 10 to make it easier to install the second sleeve 35. The right end of the second sleeve 35 may be beveled or otherwise shaped to reduce the likelihood of its catching on external objects as the filter is introduced into a well.

The first and second sleeves 31 and 35 are rigidly connected to each other in any desired manner, such as by welding of the overlapping portions, a clamping member, or threaded engagement. The sleeves 31 and 35 need not overlap one another, but an overlapping portion makes it easier to connect the sleeves to each other. The second sleeve 35 in this embodiment fits around the first sleeve 31, but the first sleeve 31 may instead fit around the second sleeve 35, or the two sleeves may have the same outer diameter and include interfitting portions. The connection between the sleeves need not be fluidtight, provided that any particulates which are large enough to be removed by the filter body 20 can be prevented from bypassing the filter body 20.

The sealing member 46 can be disposed in any location in which it can prevent particulate matter from bypassing the filter body 20 and flowing between the end connector 30 and the inner support member 10. Any type of sealing member able to withstand the expected operating conditions of the filter and having the desired sealing ability can be employed. The seal may but need not be fluidtight; preferably the seal is of an integrity to prevent the passage of particulates large enough to be removed by the filter body 20, but it may permit the passage of fluids and of particles smaller than the removal rating of the filter body 20. When the end connector 30 is intended to be capable of lengthwise movement relative to the inner support member 10, the sealing member 46 is preferably able to slide along the outer surface of the inner support member 10 while maintaining its sealing integrity. The material of the sealing member 46 can be selected from any materials typically used for sealing members in well filters in accordance with the operating conditions of the well. In oil or gas wells, a corrosion resistant metal is preferred because such wells are frequently treated with corrosive chemicals during well cleaning. In a well in a noncorrosive environment, such as a water well, nonmetals such as polymers may also be used as the sealing material. Some examples of suitable sealing members are V-seals, O-rings, crush seals, and various types of packings. In this embodiment, a packing able to withstand axial compression without damage is advantageous as the sealing member 46 because it can be used both to form a seal as well as to transmit compressive forces between the stopping member 45 and the stopping surface 33 of the first sleeve 31. Various materials can be used as a packing, including but not limited to polymers such as hard rubber or polytetrafluoroethylene, and metals. In a well for oil and gas, a preferred packing material from the standpoints of corrosion resistance, strength, and sealing ability is a fiber metal packing comprising fibers of a corrosion resistant metal such as stainless steel. The fibers can be packed into a space surrounding the inner support member 10 in the form of disconnected, loose fibers. Preferably, however, for ease of installation, the fibers are joined to each other prior to being installed in the space. At least a portion of the stopping surface 33 of the first sleeve 31 may be sloped towards the sealing member 46 with respect to the inner support member 10 so as to generate a radial inward force when pressed axially against the sealing member 46, thereby increasing the sealing force between the sealing member 46 and the inner support member 10. In the present embodiment, the stopping surface 33 of the first sleeve 31 is wedge-shaped and protrudes into the sealing member 46. The radially outer side of the stopping surface 33 exerts a radially outward force on the sealing member 46, while the radially inner side of the stopping surface 33 exerts a radially inward force on the sealing member 46 so that the sealing member 46 is pressed tightly against both the inner support member 10 and the second sleeve 35. The sealing member 46 may fit around the inner support member 10 so as to form a seal against the inner support member 10 in the absence of axial compressive forces, or the fit between the sealing member 46 and the inner support member 10 may be such that a seal is formed only when the sealing member 46 is pressed against the inner support member 10 by the stopping surface 33 of the first sleeve 31.

A preferred type of fiber metal packing 46 is formed from a material comprising cold-worked metal fibers which are mechanically interlocked with each other without sintering or with only light sintering. A particularly preferred material is a porous metal fibrous material available from Pall Corporation under the trademark PMF. This material can be obtained in sheets having a desired thickness, fiber diameter, and voids volume. For use as a packing in a filter for an oil or gas well, examples of suitable characteristics are a fiber diameter of 2 to 200 micrometers and an initial voids volume prior to installation on the inner support member 10 in the range of 20 to 80%, with the fibers being formed from a corrosion resistant metal such as stainless steel. When the packing 46 is compressed around the inner support member 10, it preferably has a removal rating which is greater than or equal to the removal rating of the filter body 20. To form a fibrous metal material such as PMF into a packing, a narrow strip of PMF having a width equal to the desired length of the packing 46 is cut from a sheet of the material and wound around a mandrel having an outer diameter approximately equal to the outer diameter of the inner support member 10. The strip is wound around the mandrel in a plurality of turns to form an annulus. Adjoining turns of the strip can be tack welded to each other to prevent the annulus from unwinding. When the annulus has reached a desired outer diameter, it is removed from the mandrel and is ready for mounting on the inner support member 10 as a packing.

Each stopping member 45 is a member which is disposed on the inner support member 10 in a path of lengthwise movement of the stopping surfaces 33 and 38 of the sleeves in order to resist lengthwise movement of the sleeves. The stopping members 45 need not have any particular shape. This embodiment includes a plurality of stopping members 45 comprising hard metal balls spaced at intervals around the circumference of the inner support member 10 between the stopping surfaces of the first and second sleeves 31 and 35. The stopping balls 45 are preferably supported by the inner support member 10 in a manner which prevents them from moving in the lengthwise direction of the inner support member 10 when an axial force is applied on the stopping balls 45 by the stopping surface 38.

The number of stopping balls 45 employed is not critical, and use of a single stopping ball 45 is possible. However, the fewer the number of stopping balls 45 that are employed, the greater are the local stresses applied to the stopping surfaces, to each stopping ball 45, and to the inner support member 10, so from the standpoint of lowering stresses and preventing stress concentrations, it may be desirable to use a plurality of stopping balls 45 spaced around the circumference of the inner support member 10.

Each stopping ball 45 in this embodiment is loosely received in a recess 13 formed in the outer surface of the inner support member 10. The stopping balls 45 may be received in individual recesses, or a plurality of the stopping balls 45 may be received in a common recess 13, such as a groove extending in the circumferential direction of the inner support member 10. A single common recess may be easier to form in the inner support member 10 than a plurality of recesses, while individual recesses produce less weakening of the wall of the inner support member 10 because the wall thickness is reduced over a smaller region. In addition, individual recesses automatically position the stopping balls 45 in desired locations around the periphery of the inner support member 10. When a plurality of stopping balls 45 are housed in a single circumferential groove, it may be desirable to employ a retainer 47 to maintain a prescribed spacing between the stopping balls 45. In the present embodiment, a recess 13 in the form of a groove extends continuously around the circumference of the inner support member 10, and the stopping balls 45 are positioned with respect to each other within the groove by an annular sheet metal cage having openings for receiving the stopping balls 45.

The one or more recesses 13 can have any cross-sectional shape which resists movement of the stopping balls 45 in the lengthwise direction. By forming the recess(es) 13 with the same contour as the stopping balls 45, the stopping balls 45 may be supported by surface contact with the recesses 13. The depth of the recess(es) 13 in the radial direction of the inner support member 10 is preferably sufficiently large that when an axial force is applied to the stopping balls 45 by the stopping surfaces 33 or 38, the stopping balls 45 will not be forced out of the recess(es) 13.

There is no restriction on the size of the stopping balls 45. The size can be selected based on factors such as the overall size of the end connector and the inner support member 10, the number of stopping balls 45, and the stress which can be applied to each stopping ball 45. The stopping balls 45 may be quite small in diameter. For example, when the inner support member 10 is formed from a standard grade of API production pipe with an outer diameter of 3.50 inches, an example of a suitable diameter for the stopping balls 45 is approximately 3/16 to 1/4 inch.

Forces can be transmitted between the stopping surfaces 33 and 38 and the stopping balls 45 either directly or indirectly. Thus, the stopping surfaces may be arranged to be capable of directly contacting the stopping balls 45, or a force transmitting member can be disposed beneath the stopping balls 45 and a stopping surface. For example, in the embodiment of FIG. 3, a force is transmitted between the stopping balls 45 and the stopping surface 33 of the first sleeve 31 by the sealing member 46, while the stopping surface 38 of the second sleeve 35 can directly contact the stopping balls 45. If it is desired to dispose the sealing member 46 in a location other than between the stopping balls 45 and the first sleeve 31, the first sleeve 31 may extend to the immediate vicinity of the stopping balls 45 so that its stopping surface 33 can directly contact the stopping balls 45.

When either stopping surface, such as the stopping surface 38 of the second sleeve 35, is intended to directly contact the stopping balls 45, the stopping surface 38 preferably is sloped towards the stopping balls 45 so that the force of the stopping surface 38 against the stopping balls 45 has a radially inward component that pushes the stopping balls 45 into the recess 13, thereby increasing the resistance of the stopping balls 45 to lengthwise movement. The slope is not critical, but the smaller the slope, i.e., the smaller the angle between the stopping surface 38 and the axis of the inner support member 10, the greater is the force pressing the stopping balls 45 into the recess 13. An example of a suitable slope for the frustoconical stopping surface 38 of the second sleeve 35 is approximately 15 degrees or less measured with respect to the longitudinal axis of the inner support member 10 in a plane containing the axis.

The stopping surface 38 of the second sleeve 35 need not have a constant slope over its length, and therefore it need not be frustoconical. For example, it can have a curved cross-sectional profile. If the slope of the surface is not constant, preferably it varies smoothly to avoid sharp corners which could produce stress concentrations.

For ease of manufacture and assembly, the stopping surface 38 of the second sleeve 35 may extend around the entire inner periphery of the second sleeve 35, as in the present embodiment. Alternatively, the second sleeve 35 may have a plurality of stopping surfaces spaced around its periphery, each stopping surface corresponding to a different one of the stopping balls 45, and the portions of the second sleeve 35 between the stopping surfaces can be shaped differently from the stopping surfaces.

An example of a method of assembling the end connector 30 of FIG. 3 is as follows. The first and second sleeves 31 and 35, the sealing member 46, the stopping balls 45, and the retainer 47 (if used) are slid over an end of the inner support member 10 to the vicinity of the recess 13 in the inner support member 10. The stopping balls 45 are positioned in the recess 13, and then the second sleeve 35 is slid over the first sleeve 31. The first and second sleeves 31 and 35 are urged towards each other by a suitable device, such as a hydraulic or mechanical press, to press the stopping surface 38 of the second sleeve 35 against the stopping balls 45 and the stopping surface 33 of the first sleeve 31 against the sealing member 46. With the sleeves 31, 35 pressed towards each other, the overlapping portions of the sleeves are tack welded to each other. The force urging the sleeves towards each other is then released, and a full weld between the first and second sleeves 31 and 35 is made. The assembled end connector 30 is now held in place on the inner support member 10 by the stopping balls 45.

Instead of sleeves 31 and 35 being preformed members which are slid over an end of the inner support member 10, one or both of the sleeves may comprise a plurality of arcuate sections which are assembled around the inner support member 10 and then joined to each other by welding or other suitable method to form a sleeve. Forming the sleeves 31 and 35 from a plurality of sections which are assembled around the inner support member 10 is useful when the inner support member 10 has upset ends or other obstructions which prevent a preformed sleeve from passing over its ends.

Depending upon its structure, the filter body 20 can be attached to the first sleeve 31 either before or after the end connector 30 is installed on the inner support member 10. For example, if the filter body 20 is a preformed member such as a unitary sintered body, the filter body 20 can be connected to the first sleeve 31 before the first sleeve 31 is disposed on the inner support member 10. If the filter body 20 is a built-up member which is formed using the inner support member 10 as a mandrel, such as a filter body 20 comprising a plurality of wrapped layers, the filter body 20 may be formed on the inner support member 10 after the end connector 30 is mounted on the inner support member 10 and attached to the first sleeve 31 as the filter body 20 is being formed.

If the sealing member 46 is of a type which must be subjected to an axial load in order to form a seal against the inner support member 10, the stopping balls 45 will be pressed against the stopping surface 38 of the second sleeve 35 and the sealing member 46 at the completion of assembly. However, if the sealing member 46 does not need to be axially loaded to form a seal, the stopping balls 45 can be spaced from or lightly contacting the stopping surface 38 and/or the sealing member 46 when no axial load is applied to the end connector 30.

Although the filter of FIG. 2 will typically be installed in a well with the end connector 30 of FIG. 3 at the lower end of the filter body 20, this end connector 30 can be located at either end of a filter body 20.

In the end connector 30 of FIG. 3, the sealing member 46 is disposed between the stopping balls 45 and the filter body 20. Alternatively, as shown in FIG. 5, the sealing member 46 may be disposed on the opposite side of the stopping balls 45, i.e., on the outer lengthwise side of the stopping balls 45. The end connector 50 of FIG. 5 includes a first sleeve 51 which is sealingly connected to an inner lengthwise end of a filter body 20 and a second sleeve 54 which is nested within the first sleeve 51. On the inner lengthwise end of the first sleeve 51, a plurality of annular steps 52 may be formed for supporting the filter body 20. On its outer lengthwise end, the first sleeve 51 has a stopping surface 53 of the same shape as the stopping surface 38 of the second sleeve 35 of FIG. 3, while the second sleeve 54 has a wedge-shaped stopping surface 55 on its inner lengthwise end which opposes a sealing member 46 like the sealing member 46 of the end connector 30 of FIG. 3. As in the end connector 30 of FIG. 3, the first and second sleeves 51 and 54 can be rigidly connected to each other in their overlapping portions in any desired manner, such as by welding or a threaded connection. For ease of assembly, both of the sleeves 51 and 54 preferably fit loosely around the inner support member 10.

When a leftward axial force is applied to the end connector 50 of FIG. 5, the force is transmitted by the stopping surface 55 of the second sleeve 54 to the stopping balls 45 through the sealing member 46. The engagement between the stopping balls 45 and the recess 13 prevents the lengthwise movement of the stopping balls 45, so the stopping balls 45 resist the axial force and prevent the lengthwise movement of the end connector 50. When a rightward axial force is applied to the end connector 50, rightward lengthwise movement of the end connector 50 is prevented by engagement between the stopping balls 45 and the stopping surface 53 of the first sleeve 51. Thus, the end connector 50 is prevented from movement with respect to the inner support member 10 in two lengthwise directions.

As stated above, during the installation of the filter in a well, of the axial forces applied to the filter body 20 and the end connectors, upward axial forces are likely to be of greater magnitude than downward axial forces. If the end connector 30 of FIG. 3 is located at the lower end of the filter body 20, the sealing member 46 can be subjected to downward axial forces applied to the end connector 30 but is not substantially subjected to upward axial forces since the sealing member 46 is on the upper side of the stopping balls 45, which resists the upward axial force. In contrast, if the end connector 50 of FIG. 5 is installed on the lower end of a filter body 20, since the sealing member 46 is on the lower side of the stopping balls 45, it is subjected to upward axial forces. As the compressive strength of the sealing member 46 will generally be lower than the compressive strength of the sleeves, when the lower end connector is expected to be subjected to large upward axial forces, it may be preferable to install the sealing member 46 on the upper side of the stopping balls 45, as in the end connector 30 of FIG. 3, to protect the sealing member 46 from the upward axial forces. Thus, although the end connector 50 of FIG. 5 can be installed at either end of a filter body 20, in some applications, it will be more suitable to install it at the upper end of the filter body 20.

Figure 6:
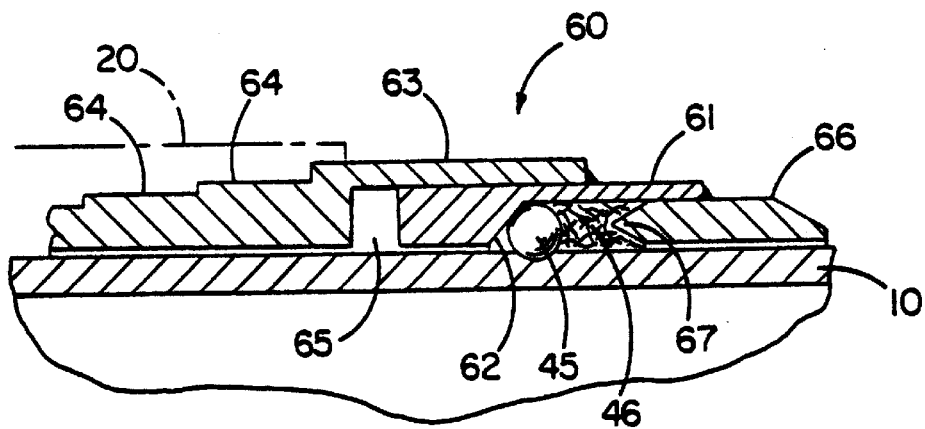
FIG. 6 is a longitudinal cross-sectional view of another variation of the end connector of FIG. 5.

FIG. 6 illustrates another end connector 60 which can be employed in the present invention. The overall structure of this end connector 60 is similar to that of the end connector 50 of FIG. 5, but the first sleeve 51 of the end connector of FIG. 5 has been replaced by two overlapping sleeves 61 and 64 which are rigidly secured to each other. A first one of the sleeves 61 is shaped substantially like the outer lengthwise end of the first sleeve 51 of FIG. 5 and has a stopping surface 62 for contacting the stopping balls 45. The other sleeve 63 is shaped substantially like the inner lengthwise end of the first sleeve 51 of FIG. 5. It has an inner lengthwise end which is secured to a filter body 20 and is equipped with annular steps 62 for supporting the filter body 20. The outer lengthwise end of sleeve 63 has a cylindrical wall which surrounds the outer periphery of the inner lengthwise end of sleeve 61 and overlaps it in the lengthwise direction. The overlapping portions of the sleeves 61 and 63 are shaped such that the amount of overlap can be adjusted. The sleeves 61 and 63 are rigidly secured to each other in the overlapping portion in a suitable manner, such as by a welded or threaded connection. The connection between the two sleeves 61 and 63 is preferably such as to prevent particulates from bypassing the filter body 20 by flowing between the two sleeves. For example, a fluidtight weld may be formed around the entire periphery of the two sleeves 61 and 63, or a sealing member may be disposed between the two sleeves. Another sleeve 66 having the same structure as the second sleeve 54 of FIG. 5 is nested in and secured to sleeve 61. Sleeve 66 has a wedge-shaped stopping surface 67 which faces the stopping surface 62 of sleeve 61. A plurality of stopping balls 45 and a sealing member 46 comprising a fiber metal packing are disposed between the stopping surfaces 62 and 67 in the same manner as in the end connector 50 of FIG. 5.

The use of overlapping sleeves 61 and 63 provides the advantage that the sleeves can be positioned on the inner support member 10 independently of each other and then rigidly secured to each other after they have been properly positioned. For example, sleeve 61, the stopping balls 45, the sealing member 46, and sleeve 66 can be first assembled on the inner support member 10. Sleeve 63 can then be disposed on the inner support member 10 surrounding sleeve 61, and the filter body 20 can be secured to sleeve 63 in a fluidtight manner. Then, the two sleeves 61 and 63 can be welded to each other to form a fluidtight connection. If assembly is performed in this order, the filter body 20 is free to move in the lengthwise direction with respect to the inner support member 10 until the two sleeves 61 and 63 are joined to each other, so the filter body 20 is not subjected to axial forces when either of the sleeves is being positioned with respect to the inner support member 10. This feature is particularly useful when the filter body 20 comprises a plurality of flexible layers which are wrapped around the inner support member 10, since the absence of axial forces enables the layers to be wrapped without wrinkling or stretching.

Sleeves which overlap each other and can be secured to each other with a desired amount of overlap can be employed in any of the filters of the present invention. For example, the first sleeve 31 of the end connector 30 of FIG. 3 can be replaced by two or more overlapping sleeves.

The end connector 60 of FIG. 6 can be installed at either end of a filter body 20, but it may be preferable to install it such that axial loads applied directly to stopping surface 62 will be larger than those applied to stopping surface 67 through the sealing member 46.

Figure 7A:
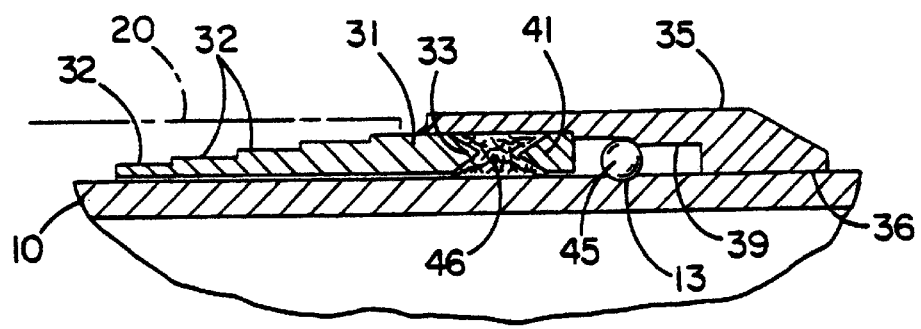
FIG. 7A is a longitudinal cross-sectional view of a variation of the end connector of FIG. 3 having a stress relief bore.
Figure 7B:
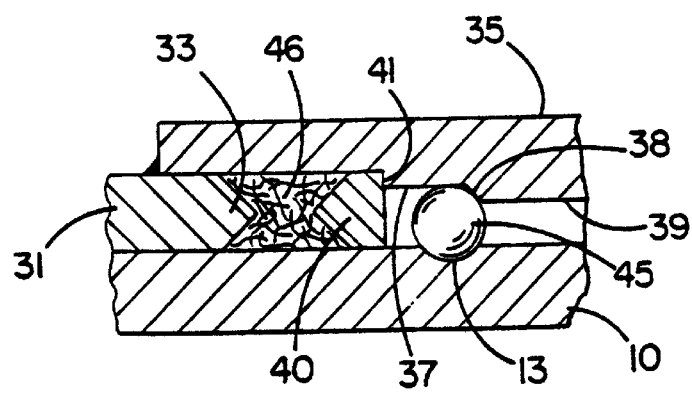
FIG. 7B is an enlarged view of a portion of FIG. 7A.

In the end connector 30 of FIG. 3, when a large axial force is applied to the end connector 30 to the left in the figure, since stopping surface 38 is substantially unyielding, stresses may build up until some portion of the filter, such as the stopping balls 45, the second sleeve 35, or the inner support member 10 undergoes failure in a manner which could enable unfiltered fluid to leak into the inner support member 10. FIGS. 7A and 7B illustrate an end connector of the present invention which has a structure which can limit the stresses which the end connector experiences when subjected to an axial load, thereby preventing failure of the end connector in stress. The overall structure of this end connector is similar to that of the end connector 30 of FIG. 3, but the second sleeve 35 includes a stress limiting structure comprising a cylindrical stress relief bore 39 which adjoins the radial inner end of the stopping surface 38 of the second sleeve 35. The stress relief bore 39 has an inner periphery spaced from the outer periphery of the inner support member 10 by a distance which is smaller than the diameter of the stopping balls 45 but large enough for the stopping balls 45 to be forced into the stress relief bore 39 without failure of the inner support member 10 or the end connector in a manner which could result in leakage. When an axial force below a prescribed level is applied to the second sleeve 35 to the left in FIG. 7A, the stopping balls 45 are pressed against the stopping surface 38 of the second sleeve 35, and the second sleeve 35 is prevented from moving to the left in the figure. When the axial force to the left reaches the prescribed level, the second sleeve 35 and/or the inner support member 10 deform to allow the radially inner end of the stopping surface 38 to pass over the stopping balls 45 and to let the stopping balls 45 enter the stress relief bore 39. Once the stopping balls 45 enter the stress relief bore 39, further axial movement of the second sleeve 35 relative to the inner support member 10 will produce no further increase in the stresses on the end connector.

The deformation which permits the stopping balls 45 to enter the stress relief bore 39 may be of various types. For example, the deformation may be in the form of Brinelling of the stopping balls 45 into the outer surface of the inner support member 10 and/or the peripheral wall of the stress relief bore 39, the stopping balls 45 may enter the stress relief bore 39 by causing the outer surface of the second sleeve 35 to bulge radially outwards either elastically or plastically, or a combination of different types of deformation may take place. The manner and amount of deformation will depend upon various parameters such as the thickness of the wall of the second sleeve 35 surrounding the stress relief bore 39, the radial dimensions of the stress relief bore 39, the hardness and modulus of elasticity of the inner support member 10 and the second sleeve 35, the depth of the recess 13 which receives the stopping balls 45, and the length of the stopping surface 38. By selecting these parameters on the basis of well known stress and strain formulas, the stopping balls 45 can be allowed to enter the stress relief bore 39 under an axial load less than a load which could cause damage to the filter of a type which could result of leakage of unfiltered fluid into the inner support member.

The end connector preferably includes a sealing member 46 to prevent particles large enough to be removed by the filter body 20 from bypassing the filter body 20 by flowing between the second sleeve 35 and the inner support member 10. The sealing member 46 in this embodiment comprises a fiber metal packing like that used in the embodiment of FIG. 3. However, rather than being pressed against the stopping balls 45, the sealing member 46 in this embodiment is compressed between the outer lengthwise end of the first sleeve 31 and an annular spacer ring 40 disposed around the inner support member 10 and surrounded by the second cylindrical region 37 of the second sleeve 35. The spacer ring 40 engages with a ledge 41 formed in the second cylindrical region 37 and extending in the circumferential direction of the second sleeve 35. The ledge 41 keeps the distance between the opposing ends of the spacer ring 40 and the first sleeve 31 constant so that the sealing member 46 will not relax when the stopping balls 45 move into the stress relief bore 39. The surface of the spacer ring 40 contacting the sealing member 46 is preferably shaped to increase the sealing force between the sealing member 46 and the inner support member 10 and the second sleeve 35. In the present embodiment, this surface is wedge-shaped and projects into the sealing member 46 in the same manner as the opposing end of the first sleeve 31.

The spacer ring 40 need not be in sealing contact with the inner support member 10 or the second sleeve 35, so it may be sized to fit loosely between these members to facilitate assembly of the end connector.

When an axial force acts on the end connector to the right in FIGS. 7A and 7B, the end connector can slide along the inner support member 10 until the outer lengthwise end of the spacer ring 40 abuts against the stopping balls 45, which prevents further movement of the end connector. In this case, the surface of the spacer ring 40 which contacts the stopping balls 45 acts as a stopping surface. This surface may be sloped with respect to the inner support member 10 so as to exert a force on the stopping balls 45 having a radially inward component, thereby increasing the resistance to axial movement of the stopping balls 45. The spacing between the spacer ring 40 and the stopping surface 38 of the second sleeve 35 can be selected in accordance with the amount of lengthwise movement of the end connector to the right in FIG. 7A it is desired to permit.

The end connector of FIGS. 7A and 7B can be disposed at either lengthwise end of the filter body 20. A stress relief bore can be used in any of the end connectors of the present invention in which a stopping surface is in contact with stopping balls or other stopping members.

A stopping member for preventing movement of an end connector need not be in the form of a ball 45. FIG. 8 illustrates an end connector employing a different type of stopping member. This end connector is similar to the end connector 30 of FIG. 3 except that the stopping member comprises a split ring 48 instead of a plurality of stopping balls 45. FIG. 9A is an exploded partially cross-sectional side view of the inner support member 10 and the split ring 48 of the end connector of FIG. 8, and FIG. 9B is a plan view of the split ring 48. The split ring 48 is received in a recess 13 in the form of a groove which is formed in the outer surface of the inner support member 10 and extends in the circumferential direction of the inner support member 10. In this end connector, the recess 13 extends around the entire circumference, but it may extend for a smaller distance. Preferably both the split ring 48 and the recess 13 have a rounded transverse cross section to reduce stress concentrations. For example, in this embodiment, the split ring 48 has a circular transverse cross section. There is no limit on the length of the split ring 48 in the circumferential direction of the inner support member 10, and the length and other dimensions of the split ring 48 can be selected so as to keep the stresses applied to the split ring 48, the inner support member 10, and the sleeves 31 and 35 to within allowable limits. The stopping surfaces on the sleeves 31 and 35 may have the same shape as when the stopping members comprise stopping balls 45. The split ring 48 interacts with the stopping surfaces on the sleeves 31 and 35 in the same manner as the stopping balls 45 of the end connector 30 of FIG. 3. Namely, the split ring 48 can directly contact the stopping surface 38 of the second sleeve 35 to resist a leftward axial force applied to the end connector, while the split ring 48 exerts a force on the stopping surface 33 of the first sleeve 31 through the sealing member 46 to resist a rightward axial force applied to the end connector. A stopping member in the form of a split ring 48 may be advantageous because it is easy to install and position on the inner support member 10.

The split ring 48 may fit in the recess 13 with any desired degree of tightness. For example, it may have an inner diameter in an unstressed state which is smaller than the outer diameter of the inner support member 10 within the recess 13 so that the split ring 48 fits snugly in the recess 13 when no external force is applied to it, or it may fit loosely around the recess 13 in a relaxed state and be pressed into intimate contact with the recess 13 when a force is applied to it by the stopping surface 38 of the second sleeve 35 or by the sealing member 46.

In order to decrease the force required to fit the split ring 48 over an end of the inner support member 10 and to make the split ring 48 conform to the shape of the recess 13, the split ring 48 may include a relieved portion in its periphery, such as a region of reduced cross section, about which the split ring 48 can be bent more easily than about other portions. For example, as shown in FIG. 9B, the split ring 48 may have a groove 49 formed in its inner periphery in a location approximately diametrically opposed to the gap between the opposing ends of the split ring 48. As in the end connector of FIGS. 7A and 7B, a stress relief bore may 39 be formed in the second sleeve 35 adjoining stopping surface 38 to limit the stresses acting on the end connector when it is subjected to an axial load.

The end connector of FIG. 8 may be installed at either end of a filter body 20.

FIG. 10 illustrates the left end connector 70 of FIG. 2 in greater detail. In contrast to the end connector 30 of FIG. 3 which is prevented from movement relative to the inner support member 10 in two axial directions, the end connector 70 of FIG. 10 is supported on an inner support member 10 so as to be capable of movement in first and second axial directions of the inner support member 10 relative to the inner support member 10. The end connector 70 includes a sleeve 71 having an inner lengthwise end which is sealingly connected to the filter body 20 and an outer lengthwise end which faces away from the filter body 20. The inner lengthwise end may be formed with annular steps 72 for supporting the filter body 20. The outer lengthwise end of the sleeve 71 has a cylindrical inner periphery which defines an annular space 73 surrounding the inner support member 10 for receiving a sealing member 75. The sealing member 75 is preferably of a type which is capable of sliding with respect to the inner support member 10 without being damaged. In this embodiment, the sealing member 75 is a fiber metal packing of the type employed in the end connector of FIG. 3, but it may be of any other suitable type, such as a V-seal. The sealing member 75 is compressed between an inner surface of the sleeve 71 and an lengthwise end surface of a sleeve-shaped retaining ring 74 which is surrounded by and secured to the sleeve 71 in any suitable manner, such as by welding or a threaded connection. Preferably, one or both of the inner surface of the sleeve 71 which contacts the sealing member 75 and the end surface of the retaining ring 74 has a portion which is sloped towards the sealing member 75 with respect to the inner support member 10 so that if the sealing member 75 is axially compressed between the sleeve 71 and the retaining ring 74, the sloped surface(s) will generate a radially inward force on the sealing member 75 to increase the sealing force between the sealing member 75 and the inner support member 10. In the illustrated embodiment, the inside of the sleeve 71 has a frustoconical surface with a constant slope for contact with the sealing member 75, while the end surface of the retaining ring 74 is wedge-shaped and protrudes into the sealing member 75. The radially outer side of the wedge-shaped end surface exerts a radially outward force on the sealing member 75, while the radially inner side of the wedge-shaped end surface exerts a radially inward force on the sealing member 75 so that the sealing member 75 is pressed tightly against both the inner support member 10 and the sleeve 71. A seal between the inner support member 10 and the end connector 70 is intended to be formed primarily by the sealing member 75, so the surfaces of the sleeve 71 and the retaining ring 74 need not be in sealing contact with the inner support member 10, and preferably both have an inner diameter which is larger than the outer diameter of the inner support member 10 to make it easier to adjust their positions in the axial direction of the inner support member 10.

The sealing member 75 may be in sealing contact with as many surfaces as are necessary to prevent particulates large enough to be removed by the filter body 20 from bypassing the filter body 20. For example, in addition to being in sealing contact with the inner support member 10, the sealing member 75 may be in sealing contact with one or both of the retaining ring 74 and the sleeve 71.

The end connector 70 can be assembled by sliding the sleeve 71, the sealing member 75, and the retaining ring 74 over the end of the inner support member 10 to a desired location. If the sealing member 75 requires an axial load to form a seal against the inner support member 10, the sleeve 71 and the retaining ring 74 are then urged towards each other in the axial direction and against the sealing member 75 by a load applying mechanism such as a press or a clamp to apply the desired load, and while the sealing member 75 is held in compression by the load applying mechanism, the sleeve 71 and the retaining ring 74 are tack welded to each other. The external axial load urging the sleeve 71 and the retaining ring 74 towards each other can then be released, and a permanent weld can be formed around their periphery. The weld need not be fluidtight provided that particles large enough to be removed by the filter body 20 which pass between the sleeve 71 and the retaining ring 74 can be prevented from bypassing the filter body 20. The filter body 20 can be connected to the inner lengthwise end of the sleeve 71 either before or after the end connector 70 is assembled on the inner support member 10, depending on the nature of the filter body 20.

Friction between the sealing member 75 and the inner support member 10 may produce some resistance to axial movement of the end connector 70, but this resistance will typically be insignificant compared to the axial forces which may act on the end connector 70 during 74 installation or use of the filter. Therefore, for practical purposes, the end connector 70 of FIG. 10 produces virtually no resistance to relative axial movement of the end connector 70 and the inner support member 10. The end connector 70 can be installed at either end of the filter body 20. When the filter body 20 or the end connectors are expected to be subjected to axial forces during 74 installation or operation of the filter, the end connector 70 of FIG. 10 may be used in conjunction with an end connector which is able to withstand the axial loads to prevent the filter body 20 from sliding along the inner support member 10. For example, the end connector 70 of FIG. 10 may be installed at the upper end of a filter body 20, while an end connector capable of resisting axial forces, such as the end connector 30 of FIG. 3, may be installed at the lower end of the filter body 20.

The filter of FIG. 2 will typically be installed in a well such that the end connector 70 of FIG. 10 is at the upper end of the filter body 20. Axial forces applied to the upper end connector in either direction can not be resisted directly by it, but if the filter body 20 is able to transmit axial loads, the axial force can be transmitted through the filter body 20 to the lower end connector and resisted by the lower end connector. The end connector 70 of FIG. 10 can also be installed at the lower end of a filter body 20 if the lower end connector is not expected to be directly subjected to axial forces, or if the filter body 20 is strong enough in compression to transmit such forces to an upper end connector which can resist upward axial forces, such as the end connector 30 of FIG. 3.

In the preceding embodiments of an end connector employing a fiber metal packing as a sealing member, when the end connector is assembled, the packing is compressed to an extent that it forms a seal against the inner support member and possibly against some portion of the end connector so as to prevent the passage of particles large enough to be removed by the filter body. However, there are a number of situations during use of a filter in which the force with which the packing is pressed against the inner support member or other member may decrease from the initial level at the time of assembly, possibly reducing the integrity of the seal formed by the packing.

For example, if the filter undergoes axial thermal expansion which causes the inner support member to translate with respect to the end connector, the packing may come into contact with regions of the inner support member having an outer diameter which is slightly different from that of the region which the packing initially contacted at the time of assembly, since the outer surface of the inner support member may not be completely smooth or regular. If the packing contacts a region having an outer diameter which is smaller than that of the region which the packing initially contacted at the time of assembly, looseness or a gap may developed between the inner periphery of the packing and the outer periphery of the inner support member, since the packing does not have a great deal of resilience after having been compressed. On the other hand, if the packing comes into contact with a region of the inner support member having an outer diameter larger than the region which the packing initially contacted at the time of assembly, the packing will be compressed in the radial direction and may be plastically deformed. After the packing passes over the region of increased outer diameter, the packing will attempt to expand in the radial direction, but if the compression involved plastic deformation, the sealing force between the packing and the inner support member and the packing will decrease from the initial value at the time of assembly.

Another situation in which the sealing force applied to the packing may decrease is if the filter is heated and the inner support member undergoes thermal expansion in the radial direction faster than the end connector does. In this case, the inner support member will exert a compressive force on the packing in the radial direction. In some cases, the compression may involve plastic deformation. When the inner support member subsequently cools to its previous temperature, because of the plastic deformation, the packing may not fit against the inner support member as tightly as it did prior to the thermal expansion, resulting in a decrease in the sealing force between the packing and the inner support member.

Still another situation in which the sealing force between the packing and the inner support member may decrease is if the space in which the packing is disposed undergoes thermal expansion at a higher rate than the packing itself. Even if the packing is made of the same material as the portions of the end connector defining the space, the packing may have a lower coefficient of thermal expansion due to its being a porous member. If the space surrounding phe packing expands faster than the packing itself, the sealing force between the packing and the inner walls of the space may significantly decrease, due to the limited resilience of the packing once it has been highly compressed.

Figure 11A:
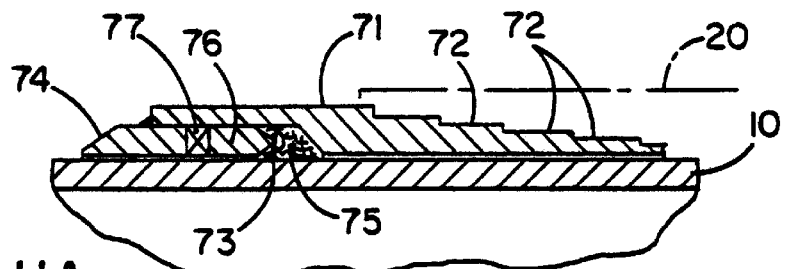
FIGS. 11A and 11B are longitudinal cross-sectional views of variation of the end connector of FIG. 10 including a mechanism for maintaining a substantially constant force on a sealing member.

FIG. 11 A illustrates an end connector according to the present invention which can maintain the sealing integrity of a sealing member of the end connector at a high level by applying a substantially constant force to the sealing member. Like the end connector 70 of FIG. 10, the end connector of FIG. 11A includes a sleeve 71 mounted on the inner support member 10 and a sealing member 75 disposed in an annular space 73 defined by the sleeve 71. The sealing member 75 comprises a fiber metal packing like that described above with respect to the embodiment of FIG. 3. A compression ring 76 for compressing the sealing member 75 adjoins the sealing member 75, and a retaining ring 74 for preventing the sealing member 75 from coming out of the annular space 73 is surrounded by and secured to the sleeve 71 in any suitable manner, such as by welding or with a threaded connection. One or both of the end surface of the annular space 73 of the sleeve 71 and the inner lengthwise surface of the compression ring 76 which contacts the sealing member 75 preferably has a portion which is sloped towards the sealing member 75 with respect to the inner support member 10 to generate a radially inward force on the sealing member 75 when pressed against the sealing member 75 to increase the sealing force between the sealing member 75 and the inner support member 10. For example, in this embodiment, the end surface of the annular space 73 opposing the sealing member 75 is frustoconical, while the inner lengthwise end of the compression ring 76 is wedge-shaped. The compression ring 76 fits sufficiently loosely between the inner support member 10 and the sleeve 71 to permit the axial movement of the compression ring 76 with respect to the sleeve 71. Between the opposing end surfaces of the retaining ring 74 and the compression ring 76 is disposed a force applying member 77 for applying a substantially constant axial load on the compression ring 76 and the sealing member 75 to prevent any significant decrease in the sealing force between the sealing member 75 and the inner support member 10. One example of a force applying member 77 is a compression spring which can exert an axial load on the compression ring 76 and the sealing member 75 to keep the sealing member 75 pressed against the inner support member 10 and the inner periphery of the sleeve 71. A wave spring or a Belleville washer which is compressed between the retaining ring 74 and the compression ring 76 is particularly suitable as a compression spring because of its compactness and ability to resist high loads, but other types of springs, such as a helical compression spring, can be employed. A single compression spring may be employed as a force applying member 77, or a plurality of compression springs can be arranged in series or in parallel. For example, a plurality of wave springs can be arranged in series, with adjoining springs in the series being nested or non-nested with respect to each other.

When the force applying member 77 is a compression spring, it is preferably selected to have a spring constant when subjected to axial compression which is lower than that of the sealing member 75 or the compression ring 76, the spring constant of each member being the axial compressive force required to produce a unit change in axial length. The lower the spring constant of the force applying member 77, the less the variation in the compressive force which it exerts on the sealing member 75 as the force applying member 77 expands or contract, and the more stable can be the sealing force exerted by the sealing member 75 against the inner support member 10 and the sleeve 71 of the end connector.

Figure 11B:
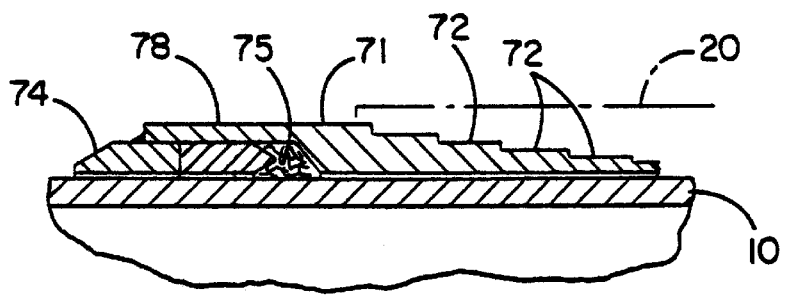

Another example of a force applying member which can prevent or limit a decrease in the sealing force exerted by a sealing member when an end connector containing the sealing member undergoes thermal expansion is a member made of a material having a sufficiently high coefficient of thermal expansion that the total thermal elongation in the lengthwise direction of the members disposed in the space containing the sealing member will be greater than or equal to the thermal elongation in the axial direction of the space itself. FIG. 11B shows an arrangement which is similar to the arrangement of FIG. 11A, but the compression ring 76 and the force applying member 77 of that figure have been replaced by a ring-shaped force applying member 78. The force applying member 78 is similar in shape to the compression ring 76 of FIG. 11A and is disposed between the inner support member 10 and the sleeve 71 of the end connector so that the force applying member 78 is free to expand with respect to members 71 and 10. The force applying member 78 is made of a material having a higher coefficient of thermal expansion than the sleeve 71, the retaining ring 74, or the sealing member 75 of the end connector. For example, if members 71, 74, and 75 are made of stainless steel, the force applying member 78 can be made of a material such as aluminum. By suitably selecting the thermal characteristics and the dimensions of the force applying member 78, the combined thermal elongation in the lengthwise direction of the sealing member 75 and the force applying member 78 force can be arranged to be close in magnitude to that of the space in which these two members 75 and 78 are contained. If the combined thermal elongation in the lengthwise direction of members 75 and 78 is substantially the same as that of the space containing these members, the compressive force acting on the sealing member 75 in the axial direction can be maintained substantially constant, thereby maintaining the sealing integrity of the sealing member 75.

A force applying member may be a combination of several different components. For example, a force applying member in the form of a compression spring (like force applying member 77) can be disposed in series with a force applying member made of a material having a high coefficient of thermal expansion (like force applying member 78). Thus, the arrangement of FIG. 11A can be modified by making the compression ring 76 of a material with a high coefficient of thermal expansion, like the force applying member 78 of FIG. 11B. With such an arrangement, the compression ring 76 will expand to prevent a decrease in sealing force on the sealing member 75 when the end connector is heated and undergoes thermal expansion, while force applying member 77 will maintain the sealing force on the sealing member 75 above a predetermined level when the end connector cools from a heated state and the compression ring 76 no longer applies an extra sealing force on the sealing member 75.

In FIGS. 11A and 11B, the force applying member 77, 78 is positioned on the outer lengthwise side of the sealing member 75, but it may be positioned anywhere that it can exert a force urging the sealing member 75 into sealing contact with the inner support member 10 or other member against which it is desired to form a seal.

A force applying member for maintaining a compressive load on a sealing member is not limited to use with an end connector of the structure illustrated in FIGS. 11A and 11B and can be used with any of the end connectors of the present invention in which it is desired to keep a packing or other sealing member axially loaded to maintain its sealing performance. For example, a force applying member can be employed in any of the end connectors shown in FIGS. 3–9.

Like the end connector 70 of FIG. 10, the end connectors of FIGS. 11A and 11B produce substantially no resistance to relative axial movement of the end connectors and the inner support member 10, so they permit thermal elongation of a filter without producing damaging stresses in the end connectors or a filter body 20. These end connectors can be installed at either end of a filter body 20. For example, they can be installed at the upper end of a filter body 20 while an end connector like that shown in FIG. 3 is installed at the lower end of the filter body 20.

Figure 12:
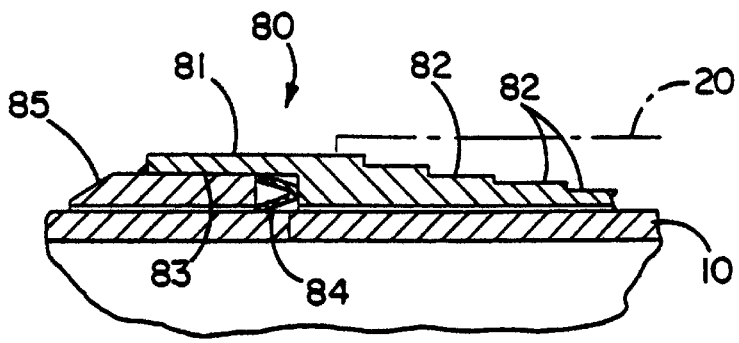
FIG. 12 is a longitudinal cross-sectional view of an end connector employing a V-seal as a sealing member.

FIG. 12 illustrates another example of an end connector 80 which can be used in the present invention. This end coinector 80 is similar in overall structure to the end connector 70 of FIG. 10, but instead of using a packing, it uses a conventional V-seal as a sealing member. The end connector 80 includes a sleeve 81 having an inner lengthwise end which is sealingly connected to the filter body 20 and an outer lengthwise end which faces away from the filter body 20. Annular steps 82 may be formed on the inner lengthwise end for supporting the filter body 20. The outer lengthwise end has a cylindrical inner periphery which defmes an annular space 83 around the inner support member 10 for receiving a V-seal 84. The V-seal 84 is maintained within the annular space 83 by a sleeve-shaped retaining ring 85, which is secured to the sleeve 81 by welding or other suitable manner. A V-seal is a deformable ring having a V-shaped transverse cross section with two legs, each of which can be elastically pressed into sealing contact with a surface. The V-seal 84 is placed in the annular space 83 between the sleeve 81 and the inner support member 10 with one leg of the V-seal 84 pressed against the inner periphery of the sleeve 81 and the other leg pressed against the outer periphery of the inner support member 10. A V-seal is particularly suitable for use as a sealing member in an end connector according to the present invention because it is easy to install and durable, it is self-energizing, it can slide with respect to the inner support member 10 while maintaining a reliable seal, and it can be manufactured from a wide variety of materials, including but not limited to metals, plastics, and ceramics. A V-seal provides an asymmetric sealing effect in that it seals more tightly when the fluid pressure acting against the space between the legs (the left side of the V-seal 84 in FIG. 12) is greater than the fluid pressure acting on the other side. Since the purpose of the V-seal 84 is to prevent particulates from leaking from the outside of the connector into the inner support member 10, i.e., to prevent particulates from leaking from left to right in the figure, the V-seal 84 is preferably installed with the legs facing away from the filter body 20 so that the sealing force will be greater when the fluid pressure on the outside of the filter is greater than on the inside of the filter. An example of a suitable material for the V-seal 84 when the filter is to be used in a corrosive environment is stainless steel. The retaining ring 85 may be either spaced from or contacting the V-seal, but preferably any contact does not exert a high axial load on the V-seal 84. A seal between the sleeve 81 and the inner support member 10 is intended to be formed primarily by the V-seal 84, so the retaining ring 85 and the sleeve 81 need not provide any sealing effect and preferably they can smoothly slide with respect to the outer surface of the inner support member 10 for ease of assembly and to reduce resistance to thermal expansion.

Like a fiber metal packing, a V-seal 84 produces only relatively low frictional resistance to movement of the surfaces with which it contacts. Therefore, for practical purposes, the end connector 80 of FIG. 12 produces virtually no resistance to relative axial movement of the end connector 80 and the inner support member 10 when the filter body 20 is subjected to an axial load or the filter undergoes thermal expansion. The end connector 80 of FIG. 12 can be used in the same manner as the end connector of FIG. 10.

A typical metal V-seal requires a fairly smooth surface finish (on the order of 32 microinches or better) on the surface which it is to contact in order to form a reliable seal. However, commercially available production pipe or drill pipe for oil or gas wells has a fairly rough surface finish as manufactured. When a joint of such pipe is used as the inner support member 10, it may be desirable to machine the outer surface of the inner support member 10 to obtain a smoother finish in the region to be contacted by the V-seal 84, thereby increasing the reliability of the seal between the V-seal 84 and the inner support member 10. For example, the outer periphery of the inner support member 10 may be skim cut along a portion of its length to provide a smoother sealing surface.

Figure 13:
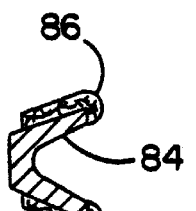
FIG. 13 is a cross-sectional view of a V-seal having a fiber metal gasket on its radially inner and outer portions.

Alternatively, the V-seal 84 may be modified to obtain a sealing member which can be sealed against a relatively rough surface. FIG. 13 is a transverse cross-sectional view of a sealing member which can be used in the present invention. This sealing member comprises a conventional V-seal 84 and gaskets 86 disposed on the legs of the V-seal 84 in portions which need to be in sealing contact with some surface. The gaskets 86 can be formed of any material which is capable of forming the desired seal and having the desired durability. When the filter is to be used in a well for oil or gas, a gasket 86 made of fiber metal such as that used for the fiber metal packing 46 in the end connector 30 of FIG. 3 is suitable. When the filter is intended for use in a noncorrosive environment, nonmetals such as rubber can be used for the gaskets 86. Each gasket 86 of FIG. 13 comprises a strip cut from a sheet made of porous fiber metal material available from Pall Corporation under the trademark PMF. Each strip is wrapped around the entire circumference of one of the legs of the V-seal 84 and tack welded to secure the strip to the V-seal 84. When the sealing member shown in FIG. 13 is inserted into the annular space 83 between the sleeve 81 and the inner support member 10 as shown in FIG. 12, the V-seal 84 acts as a spring and presses the gaskets 86 into sealing contact with the inner surface of the sleeve 81 and the outer surface of the inner support member 10. The gaskets 86 are compressible, so they can conform to the irregularities in the surfaces which they contact and create a reliable seal even against a pipe having a relatively rough surface finish.

Figure 14:
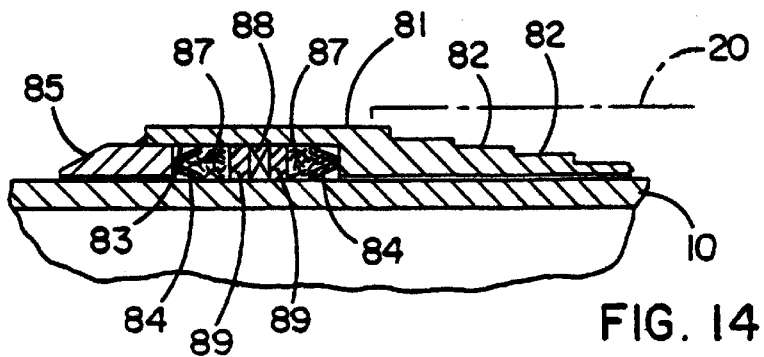
FIG. 14 is a longitudinal cross-sectional view of an end connector employing a plurality of sealing members.

FIG. 14 illustrates another end connector according to the present invention. The overall structure of this end connector is similar to that of the end connector 80 of FIG. 12 except that a seal is formed between the inner support member 10 and a sleeve 81 by both V-seals 84 and a fiber metal packing 87 of the same material used for the fiber metal packing 46 in the end connector 30 of FIG. 3. A pair of V-seals 84 is disposed in the annular space 83 between the sleeve 81 and the inner support member 10, with one leg of each V-seal 84 in sealing contact with the inner periphery of the sleeve 81 and the other leg in sealing contact with the outer periphery of the inner support member 10. The V-seals 84 are disposed with the opening between the legs of each V-seal 84 opposing the other V-seal 84, and one or more fiber metal packings 87, such as that used in the end connector 70 of FIG. 10, are disposed in the space between the V-seals 84. The V-seals 84 may but need not contact the lengthwise end walls of the space 83. In the present embodiment, the lefthand V-seal 84 abuts the inner lengthwise end surface of the retaining ring 85, the other V-seal 84 abuts an inner wall of the sleeve 81, and two fiber metal packings 87 are compressed between the V-seals 84.

The packings 87 may but need not be in sealing contact with the inner support member 10 or the sleeve 81. A main function of the packings 87 is to reinforce the V-seals 84 and to increase the sealing force between the V-seals 84 and the inner support member 10 by spreading the legs of each V-seal 84 in the radial direction. A pressure differential acting on the lefthand V-seal 84 in a direction tending to decreasb the angle between the legs will exert an axial force pressing the righthand packing 87 more tightly against the legs of the righthand V-seal 84, thereby pressing the righthand V-seal 84 more tightly against the sleeve 81 and the inner support member 10 and increasing the sealing force exerted by the righthand V-seal 84. Similarly, a pressure differential tending to decrease the angle between the legs of the righthand V-seal 84 will exert an axial force which presses the lefthand packing 87 more tightly against the lefthand V-seal 84, thereby urging the legs of the lefthand V-seal 84 apart and increasing the sealing force between the lefthand V-seal 84 and the inner support member 10 and the sleeve 81. The packings 87 may be replaced by a different member capable of exerting an outward force on the legs of the V-seals 84, such as a compressible or rigid member having wedge-shaped ends which are shaped to fit between the legs of each V-seal 84.

As in the embodiments of FIGS. 11A and 11B, the end connector 80 may include a force applying member to maintain the packings 87 under compression. In this embodiment, a force applying member 88 such as a spring (a wave spring, a helical compression spring, a Belleville washer, etc.) or a member made of a material with a high coefficient of thermal expansion is disposed between the two packings 87. Depending upon the shape of the force applying member, spacer rings 89 or other members can be slidably disposed in the space between the inner support member 10 and the sleeve 81 of the end connector on either side of the force applying member 88 for transmitting compressive force between the force applying member 88 and the packings 87. In the figure, the spacer rings 89 are flat rings. Alternatively, they may be chisel-pointed like the spacer ring 76 of FIG. 11A or otherwise shaped to exert a radially inward and/or outward force on the packings 87. If the filter is not expected to be subjected to conditions which could result in a decrease in the compressive force acting on the packings 87, one or more packings may completely fill the space between the opposing V-seals 84.

One or both of the V-seals 84 can be replaced by a modified sealing member of the type illustrated in FIG. 13 including a V-seal 84 and gaskets 86 attached to the legs of the V-seal 84.

One of the V-seals 84 of the end connector of FIG. 14 can be omitted and the space occupied by that V-seal 84 can be filled by the packing 87. Like the end connector 70 of FIG. 10, this end connector produces substantially no resistance to relative axial movement of the end connector and the inner support member 10, so it enables the filter to undergo thermal elongation without damage. This end connector may be installed at either lengthwise end of the filter body 20.

FIGS. 15 and 16 are respectively a longitudinal cross-sectional view and a transverse cross-sectional view of another example of an end connector 90 for use in a filter according to the present invention. The illustrated end connector 90 can resist axial forces to both the left and right in the figure as well as torsional loads.

The overall structure of this end connector 90 is similar to that of the end connector of FIG. 11A. It includes a sleeve 91 which fits around the inner support member 10 and has an inner lengthwise end sealingly connected to the filter body 20. The inner lengthwise end may be equipped with annular steps 92 for supporting the filter body 20. The outer lengthwise end of the sleeve 91 has a cylindrical inner periphery which defines an annular space 93 surrounding the inner support member 10. A sealing member in the form of a fiber metal packing 94, a compression ring 95, a force generating member 96, and a sleeve-shaped retaining ring 97 are disposed in the annular space 93 in the same manner as in the end connector of FIG. 11A. The retaining ring 97 is secured to the sleeve 91 in a suitable manner, such as by welding. A sealing member for use in the present embodiment is not limited to a fiber metal packing, and sealing members such as a V-seal or a V-seal in combination with a fiber metal packing can also be employed. Whatever the type of sealing member, it is preferably of a type which is capable of sliding with respect to the inner support member 10 while maintaining a seal.

One or more through holes 98 are formed in the sleeve 91 between its inner and outer periphery, and each through hole 98 receives a pin 99 which engages with a recess 14 formed in the outer surface of the inner support member 10. The engagement between the pins 99 and the recesses 14 prevents the axial movement of the sleeve 91 relative to the inner support member 10. There may be a single pin 99, or a plurality of pins 99 may be employed to distribute stresses around the circumference of the sleeve 91 and reduce the stress applied to each pin 99. The pins 99 may engage with individual recesses 14, or they may engage with a common recess 14, such as a circumferentially extending groove formed in the inner support member 10. The through holes 98 and the pins 99 need not have any particular shape. It may be desirable if both are rounded to prevent stress concentrations. The pins 99 are preferably received in the through holes 99 and/or the recesses 14 in a manner which prevents them from being easily dislodged. For example, they may be press fit, screwed, welded, or otherwise secured in the through holes 98 and/or the recesses 14. Preferably, particulates large enough to be removed by the filter body 20 are prevented from bypassing the filter body 20 by flowing through the through holes 98. For example, the pins 99 may be sealed to the through holes 98, or a seal can be provided in a location between the through holes 98 and the filter body 20. In the present embodiment, each pin 99 is welded to the sleeve 91 in a fluidtight manner.

The pins 99 may have any desired strength. For example, they may be of a strength such as to maintain the end connector 90 stationary on the inner support member 10 up to the failure stress of the sleeve 91 or the inner support member 10 or other portion of the filter, or the pins 99 may be designed to act as shear pins and break below the failure stress of other portions of the filter. As an example of the latter case, the pins 99 may be designed to withstand axial forces which are expected to be applied to the filter during installation in a well but to shear when the filter is subjected to thermal stresses above a certain level. If the pins 99 are intended to act as shear pins, the cross section of the pins may be reduced at a location near the outer periphery of the inner support member 10 where shearing forces acting on the pins 99 are highest. For example, in the present embodiment, each of the pins 99 has a circumferentially extending groove 99a formed around its periphery at the interface between the inner support member 10 and the sleeve 91. After the pins 99 break, the sleeve 91 can slide in the axial direction with respect to the inner support member 10. The force level at which the pins 99 break can be adjusted by changing the number of pins 99 or by changing the cross-sectional area of the region of reduced cross section.

The end connector 90 of FIG. 15 can be installed at either end of a filter body 20.

Figure 19:
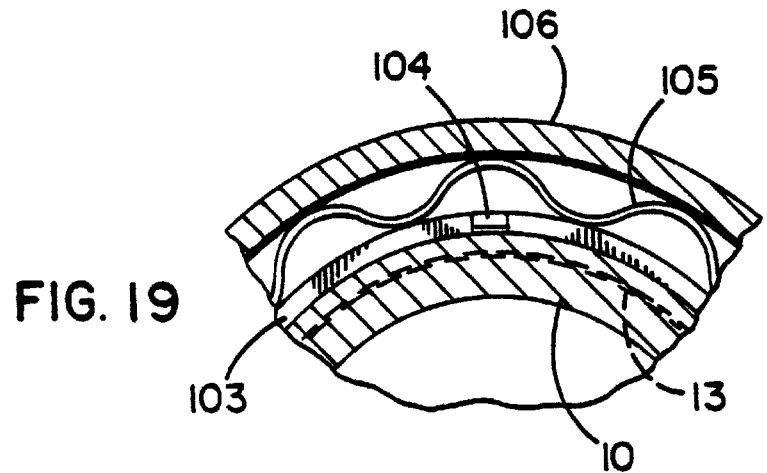
FIG. 19 is a transverse cross-sectional view taken along line 19—19 of FIG. 17.

FIGS. 17–19 illustrate another end connector 100 which can be employed in the present invention. FIG. 17 is a longitudinal cross-sectional view of the end connector 100, FIG. 18 is a longitudinal cross-sectional view of the outer lengthwise end of a first sleeve 101 of the end connector 100, and FIG. 19 is a transverse cross-sectional view taken along line 19—19 of FIG. 17. This end connector 100 includes a first cylindrical sleeve 101 having an inner lengthwise end sealingly connected to a filter body 20 and an outer lengthwise end facing away from the filter body 20. The inner lengthwise end of the first sleeve 101 may be formed with annular steps 102 for supporting the filter body 20. The outer lengthwise end has a radially inward projection 103 which resiliently engages with a recess 13 formed in the outer periphery of the inner support member 10. The engagement between the projection 103 and the recess 13 enables the first sleeve 101 to resist axial forces up to a predetermined level. When that level is exceeded, the portion of the first sleeve 101 on which the projection 103 is formed can deform radially outward to release the engagement between the recess 13 and the projection 103 and permit relative axial movement of the first sleeve 101 and the inner support member 10.

The force at which the projection 103 disengages from the recess 13 can be set at any desired level. For example, it can be a level which is lower than axial forces which could damage the filter but which is high enough for the end connector 100 to withstand axial forces normally applied to it during installation of the filter into a well.

In this embodiment, the outer lengthwise end of the first sleeve 101 has a reduced wall thickness which makes it more flexible than other portions of the first sleeve 101. A projection 103 in the form of a rounded lip extends radially inwards from the outer lengthwise end of the first sleeve 101 around its periphery. Axial slits 104 may be formed in the first sleeve 101 at intervals to divide it into a plurality of sections, thereby increasing the flexibility of the first sleeve 101 and facilitating radial movement of the projection 103.

Engagement between the projection 103 and the recess 13 can be produced in a variety of ways. For example, the first sleeve 101 can be formed such that the inner diameter of the projection 103 in a relaxed state is smaller than the outer diameter of the inner support member 10 adjoining the recess 13, so that when the end connector 100 is disposed on the inner support member 10, the projection 103 will project into the recess 13 without the need to apply any external radially inward force on the outer lengthwise end of the first sleeve 101. Alternatively, a biasing member can be provided to urge the projection 103 radially inwards. In this embodiment, a spring 105 in the form of a strip of metal bent into a sinusoidal shape is disposed around the first sleeve 101 between the first sleeve 101 and a second sleeve 106 which surrounds the metal strip. The first and second sleeves are secured to each other in a suitable manner, such as by welding or by a threaded connection. The metal strip elastically resists radially outward forces acting on the outer lengthwise end of the first sleeve 101. When a spring 105 is employed to urge the projection 103 inwards against the inner support member 10, the inner diameter of the projection 103 in a relaxed state may be larger than the outer diameter of the inner support member 10 adjoining the recess 13. A compressible packing disposed in the annular space between the first and second sleeves can also be used to urge the projection 103 inwards.

A sealing member 108 is disposed between the second sleeve 106 and the outer periphery of the inner support member 10 to prevent particles large enough to be removed by the filter body 20 from bypassing the filter body 20. The sealing member 108 is preferably of a type which can maintain a seal while undergoing axial movement relative to the inner support member 10. In the present embodiment, the sealing member 108 comprises a fiber metal packing like that used in the end connector 30 of FIG. 3, but the sealing member 108 may be of various other types, such as a V-seal or a combination of a V-seal and a fiber metal packing. The sealing member 108 is disposed between a radially extending wall 107 of the second sleeve 106 and a sleeve-shaped retaining ring 109 which is surrounded by and secured to the second sleeve 106 in any suitable manner, such as by welding or threaded connection. One or both of the opposing axially-facing surfaces of the wall 107 of the second sleeve 106 and the retaining ring 109 may have a portion which is sloped with respect to the inner support member 10 towards the sealing member 108 so that when pressed against the sealing member 108, the sloping surfaces will exert a radially inward force on the sealing member 108 to increase the sealing force of the sealing member 108 against the inner support member 10. For example, in the present embodiment, the inner lengthwise end of the retaining ring 109 is wedge shaped and projects into the sealing member 108.

This end connector 100 can be installed on either end of a filter body 20.

Figure 20:
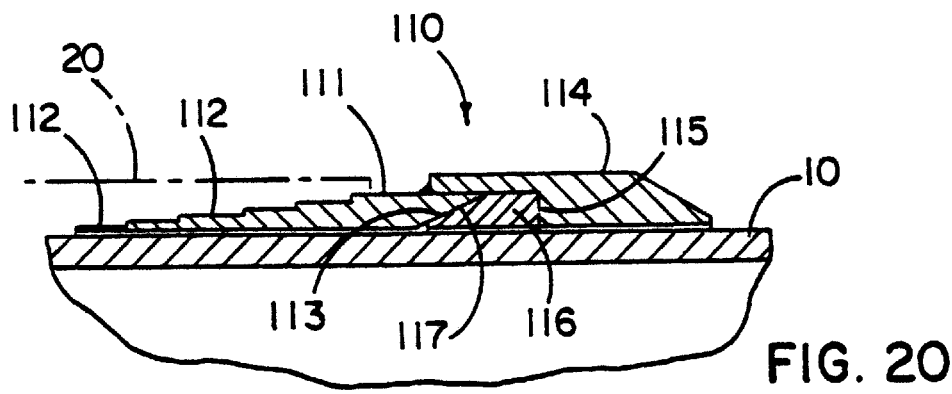
FIG. 20 is a longitudinal cross-sectional view of another an end connector according to the present invention.

FIG. 20 illustrates another end connector 110 which can be employed in a filter according to the present invention. This end connector 110 includes first and second overlapping sleeves 111 and 114 and a wedge-shaped sealing ring 116 disposed between the sleeves and urged against the inner support member 10 to form a seal against the inner support member 10. Each of the sleeves 111 and 114 and the sealing ring 116 extends around the entire periphery of the inner support member 10. The first sleeve 111 includes an inner lengthwise end sealingly connected to a filter body 20 and an outer lengthwise end having a sloped surface 113 which slopes towards the sealing ring 116 with respect to the inner support member 10. The inner lengthwise end may be formed with annular steps 112 for supporting the filter body 20. The second sleeve 114 has a cylindrical outer wall which overlaps and is secured to the first sleeve 111 in any suitable manner, such as by welding or threaded connection. A radially extending end wall 115 projects from the cylindrical outer wall towards the inner support member 10. The sealing ring 116 is disposed between the outer end surface of the first sleeve 111 and the end wall 115 of the second sleeve 114. The sealing ring 116 has a sloped surface 117 on its inner lengthwise end which contacts the sloped surface 113 of the first sleeve 111 and slopes in the same direction as sloped surface 113. When the first sleeve 111 is pressed against the sealing ring 116, the contact between the two sloping surfaces 113 and 117 produces a wedging action which forces the inner lengthwise end of the sealing ring 116 radially inwards against the outer surface of the inner support member 10.

The contact between the sealing ring 116 and the inner support member 10 may produce some frictional resistance to lengthwise movement of the end connector 110, but the resistance will be small relative to the lengthwise forces which may act on the filter body 20 or the end connector 110 during installation or operation of the filter, so from a practical standpoint, the end connector 110 produces virtually no resistance to relative axial movement of the end connector 110 and the inner support member 10.

The sleeves 111 and 114 and the sealing ring 116 can be made of any materials having the strength and durability to withstand the conditions in which the filter will be used. When the filter is to be used in a well for oil or gas, a corrosion resistant metal such as stainless steel is suitable for these members.

Figure 21:
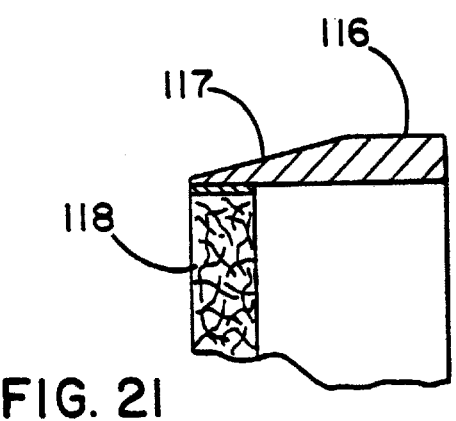
FIG. 21 is an enlarged longitudinal cross-sectional view of a portion of the friction ring of the end connector of FIG. 20.

The end connector 110 preferably includes a sealing arrangement for preventing particles large enough to be removed by the filter body 20 from bypassing it. Any suitable sealing arrangement can be employed, such as any of the sealing arrangements used in the preceding embodiments. A particularly preferred arrangement is one in which a seal is formed between the inner periphery of the sealing ring 116 and the outer periphery of the inner support member 10. If the opposing surfaces of the sealing ring 116 and the inner support member 10 are sufficiently smooth, the contact between the opposing surfaces may be adequate to form a reliable seal. Alternatively, some sort of sealing member may be disposed between the opposing surfaces. For example, as shown in FIG. 21, which is a longitudinal cross-sectional view of the sealing ringgasket 11gasket 118 can be installed on the inner periphery of the sealing ring 116 in a region in which it is desired to form a seal. The gasket 118 in FIG. 21 comprises a thin strip of a fiber metal filter material of the same type which is used to form the fiber metal packing 46 in the end connector 30 of FIG. 3. The strip is disposed around the entire periphery of the sealing ring 116 and secured to the sealing ring 116 by tack welding, for example. An example of a suitable material for forming the gasket 118 is a strip of a fiber metal filter medium sold by Pall Corporation under the trademark PMF and having an uncompressed thickness of approximately 0.015 inches and a voids volume of approximately 20–80%.

This end connector 110 can be installed on either end of a filter body 20. An example of a method of assembling the end connector 110 is as follows. The sleeves 111 and 114 and the sealing ring 116 are slid over the end of the inner support member 10 to a desired location. The first and second sleeves 111 and 114, with the sealing ring 116 disposed between them, are then urged towards each other and against the sealing ring 116 by a press, a clamp, or other suitable device, and the contact between the sloped surface 113 of the first sleeve 111 and the sloped surface 117 of the sealing ring 116 presses the inner periphery of the inner lengthwise end of the sealing ring 116 into frictional contact with the outer surface of the inner support member 10. In this state, the first and second sleeves 111 and 114 are tack welded to each other, and the compressive force between the sleeves is released. Permanent welds can then be formed between the first and second sleeves in the overlapping portions. The first sleeve 111 can be sealingly connected to the filter body 20 either before or after the end connector 110 is assembled, depending upon the nature of the filter body 20.

In each of the embodiments of the present invention in which an end connector of a filter is capable of lengthwise movement relative to an inner support member of the filter, it is highly desirable to prevent the perforations or other openings for filtrate formed in the inner support member from moving with respect to a sealing member of an end connector to a location in which unfiltered fluid can flow through the perforations. For example, referring to FIG. 22, which is an enlarged view of one lengthwise end of the filter of FIG. 11A, the movement of the inner support member 10 with respect to the end connector 70 preferably does not allow the perforations 12 closest to a lengthwise end of the inner support member 10 to move to the left of the sealing member 75, since in this position unfiltered fluid could enter the perforations 12. Therefore, when the filter is assembled, the distance D1 between the perforations 12 closest to a lengthwise end of the inner support member 10 and the outer lengthwise end of the sealing member 75 is preferably greater than or equal to the maximum expected travel of the inner support member 10 relative to the end connector 70 in the lengthwise direction of the inner support member 10.

The linear thermal expansion of an inner support member made of a single joint of production pipe, typically having a length of 20 to 30 feet, will generally be on the order of a fraction of an inch. For example, if the temperature of an inner support member comprising a 20-foot length of API production pipe of carbon steel with a coefficient of linear thermal expansion on the order of $12 \times 10^{-6}/°$ C. is raised by 100° C. from room temperature, the inner support member will undergo linear thermal expansion of approximately one-fourth of an inch. If the relative movement of an inner support member and an end connector is of this magnitude, it is easy to provide sufficient separation between the perforations in the inner support member and a sealing member of an end connector.

However, in some situations, the travel of an inner support member relative to an end connector may be far larger than the above value, such as on the order of feet. When a pipe string equipped with one or more filters is installed in certain types of wells, it is possible for the formation surrounding the filter to collapse against the filter bodies of the filters and restrain the filter bodies against movement in the lengthwise direction, while still permitting the inner support members of the filters and the pipe string to translate within the well. An example of a situation in which this phenomenon can occur is open hole completion, where there is no casing surrounding a pipe string used to remove fluids from a well, and the formation in which the well is formed is allowed to collapse against the pipe string. When the pipe string is subjected to an elevated temperature, such as when steam is injected into the well through the pipe string, it will undergo linear thermal expansion and may elongate by up to several feet. The elongation results in linear translation of portions of the pipe string within the well, as sometimes evidenced by surface pipe at a well head rising out of the ground by several feet. If filters are connected in series with the pipe string, the inner support members of the filters will translate along with the pipe string. If the filter bodies mounted on the inner support members are restrained against lengthwise movement by the formation, the inner support members of the filters will undergo considerable translation with respect to the filter bodies. The amount of linear translation of a particular inner support member with respect to its filter body will depend upon the length of pipe or inner support members located beneath the particular inner support member, because the translation will include the cumulative linear thermal expansion of the pipe or inner support members located beneath it. As an example, if a filter connected in series with a pipe string within a well is located 2000 feet above the bottom of the pipe string, and the pipe string elongates upwards in response to a temperature increase of the pipe string of approximately 100° C., the thermal elongation of the 2000-foot length of pipe beneath the inner support member will cause the inner support member to translate upwards by approximately 2.4 feet, assuming that the pipe string is made of carbon steel with a coefficient of linear thermal expansion of approximately $12 \times 10^{-6}/°$ C., and ignoring any possible axial compressive forces which would reduce the thermal elongation. If the filter body mounted on the inner support member is restrained against movement by the formation in which the filter is installed, the inner support member will travel with respect to the filter body by this amount.

Figure 22:
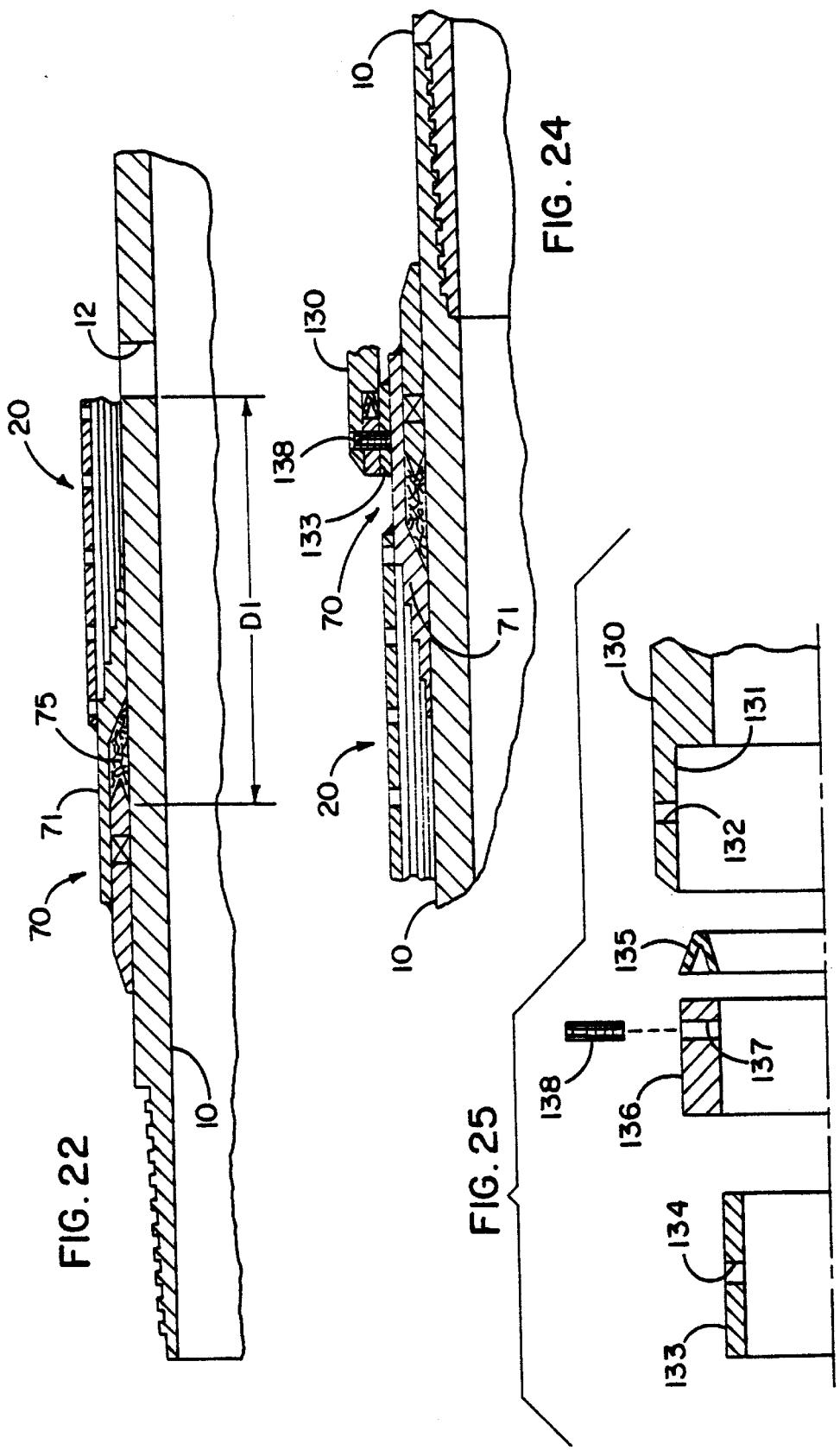
FIG. 22 is an enlarged view of the end connector 11, showing the distance that the inner support member can translate before a seal is lost.

It is possible to increase the spacing D1 in FIG. 22 between the perforations in an inner support member and the sealing member of an end connector to a distance greater than or equal to the expected amount of travel of the inner support member during thermal elongation, but doing so either decreases the flow of filtrate through the perforations due to a decrease in the number of perforations, or it requires an increase in the size of the perforations and/or a decrease in the spacing between adjacent perforations to maintain the same flow rate, resulting in a decrease in the strength of the inner support member.

Figure 23:
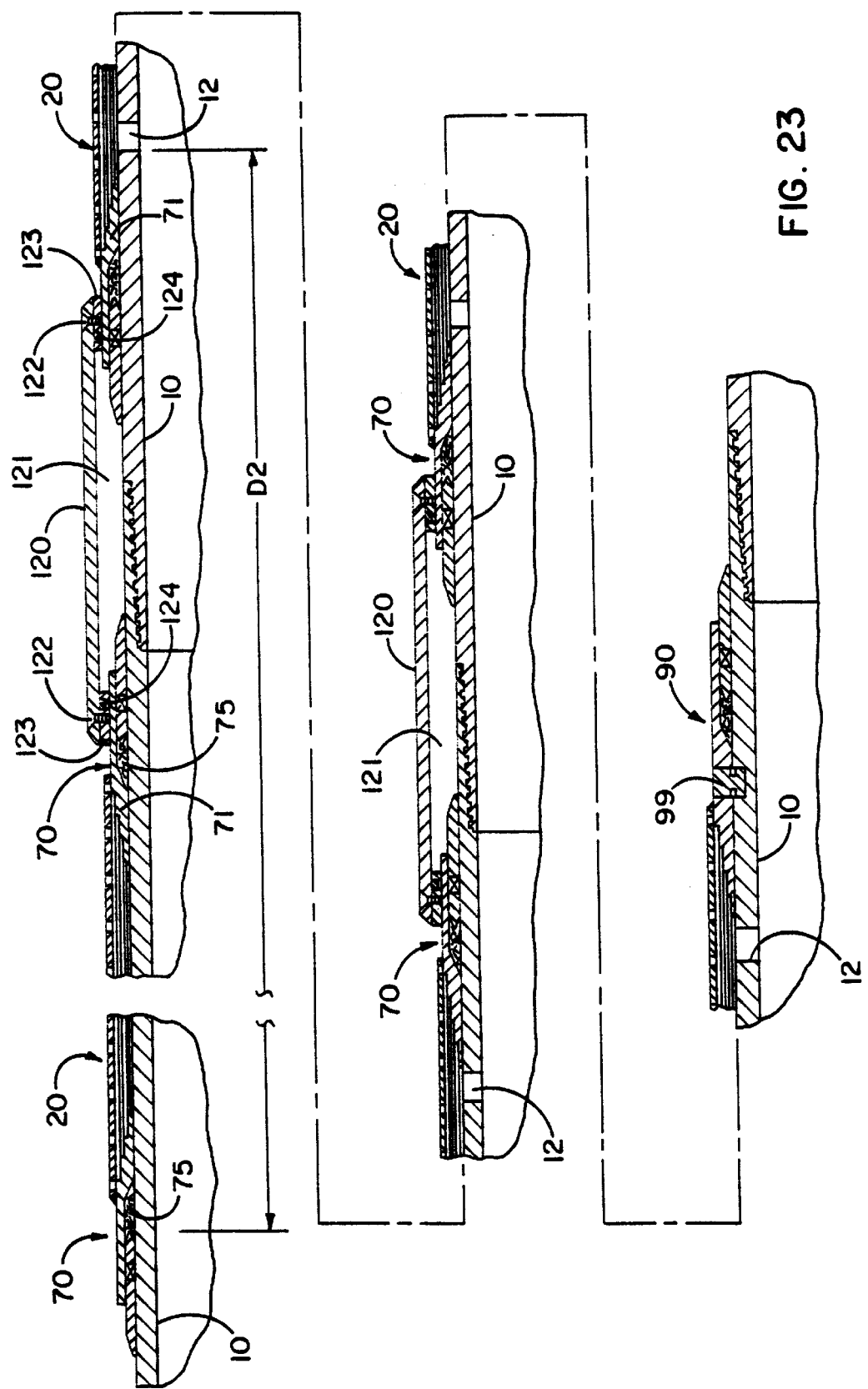
FIG. 23 is a longitudinal cross-sectional view of an embodiment of the present invention in which a joiner sleeve is connected between the filter bodies of adjoining filters.

FIG. 23 is a longitudinal cross-sectional view of an embodiment of a filter according to the present invention which permits extensive travel of an inner support member 10 relative to a filter body 20 mounted on the inner support member 10 without perforations 12 in the inner support member 10 being exposed to unfiltered fluid in a well and without requiring a decrease in the number of perforations or a decrease in the strength of the inner support member. This figure shows a plurality of filters according to the present invention connected in series. For ease of illustration, the series is shown as comprising only three filters, but there may be any number of filters in the series, which may be hundreds or even thousands of feet long. The filters may be connected in series with a pipe string, with other filters, with a pump, or other members. When the filters are installed in a well, the filter at the bottom of FIG. 23 will usually be the lowermost filter in the series. The filters may but need not be identical in structure to each other. Each filter has an inner support member 10 and a filter body 20 mounted on the inner support member 10 and sealed to the inner support member 10 by end connectors disposed at opposite lengthwise ends of the filter body 20. The inner support members 10 of adjoining filters are connected to each other in a manner such that the end connectors can slide over the ends of the inner support members 10. In FIG. 23, the inner support members 10 are connected with each other by a flush-joint threaded connection having an outer periphery which is flush with the outer peripheries of the regions of the inner support members 10 containing perforations 12. The end connectors of the filters may have a structure which enables them to translate in the lengthwise direction with respect to the inner support members 10 in response to relatively low axial forces, like the end connectors shown in FIGS. 10–14 and 20–21, for example, or the end connectors may be able to resist axial forces up to a certain level which will not damage the filters and then slide with respect to the inner support members 10, like the end connectors shown in FIGS. 15–19, for example. In addition, if any of the filters have filter bodies which are not expected to undergo any lengthwise movement with respect to the corresponding inner support member 10, those filters may have one or more end connectors which resist axial loads up to the failure strength of the filter, like the end connector of FIG. 3. In the present embodiment, the lowermost filter in the series has a lower end connector 90 like the one shown in FIG. 15 which is equipped with shear pins 99 which resist axial forces up to a predetermined level which may be applied to the end connector 90 when the series of filters is being inserted into a well and which shear when the axial force exceeds the predetermined level to permit thermal elongation without damage to the filter bodies 20. The remaining end connectors 70 are of the type illustrated in FIG. 11A which are free to slide with respect to the inner support members 10 under a fairly low axial force and which provide only frictional resistance to movement of the inner support members 10. FIG. 23 shows the filters as they appear when assembled, with the perforations 12 of the inner support member 10 of each filter disposed between the sealing members of the two end connectors of the filter.

The end connectors 70 of adjoining filters are connected with each other by a joiner sleeve 120 which surrounds the inner support member 10 and defines a space 121 between adjoining filter bodies 20. The joiner sleeve 120 is connected to the end connectors 70 in a manner which prevents particles small enough to be removed by the filter bodies 20 from entering the space 121. Therefore, even if the inner support member 10 translates by a distance such that the perforations 12 in the inner support member 10 pass beneath the sealing members 75 of the end connectors 70, the perforations 12 will communicate with the inside of the space 121 rather than with unfiltered fluid surrounding the filters, so any particles which flow into the perforations 12 from the space 121 will be smaller than the removal rating of the filter. The inside of the space 121 need not be dry. For example, the space 121 may be filled with filtered fluid which seeps from the filter bodies 120 past the sealing members 75 of the end connectors 70.

The length of each joiner sleeve 120 is not critical and will depend upon the spacing between the end connectors 70 to which the joiner sleeve 120 is to be attached. A typical distance of the outer lengthwise end of an end connector from the lengthwise end of the inner support member 10 on which it is mounted is on the order of 12 inches to allow enough space for a wrench or other tool to grasp the lengthwise end of the inner support member 10 when the inner support member 10 is being connected to another member. In this case, a joiner sleeve 120 spanning the space between two end connectors 70 might have a length of approximately twice this distance, i.e., approximately 24 inches.

The joiner sleeve 120 is preferably made of a material which is impervious to particles large enough to be removed by the filter bodies 20. It may be a rigid member capable of transmitting one or more types of loads (tensile, compressive, or torsional) between adjoining filter bodies 20, or it may be a flexible member, such as a bellows or a flexible sleeve, which is not designed to transmit loads and merely encloses the space 121. In the present embodiment, the joiner sleeve 120 comprises a rigid cylindrical sleeve of a corrosion resistant metal, such as stainless steel, which can transmit both tensile and compressive forces between adjoining filter bodies 20 to maintain a constant spacing between adjoining filter bodies 20 when the filters are being inserted into a well or when thermal elongation of the filters is taking place. The material of which the sleeve is made can be selected in accordance with the desired strength and the degree of corrosion resistance required of it. It can be either metallic or nonmetallic. In the present embodiment, the joiner sleeves 120 are formed of 316L stainless steel.

The joiner sleeves 120 can be connected to the end connectors 70 of adjoining filters in any manner which prevents particles large enough to be removed by the filter body 20 from passing between the joiner sleeve 120 and the end connectors 70. In some cases, the joiner sleeves 120 can be directly welded to the end connectors 70, or a nonwelded connection using screws, pins, mating parts, bonding, a press fit, a shrink fit, etc. may be appropriate if the joiner sleeve 120 and the end connectors 70 are made of materials which cannot be readily welded to each other or if welding would be inconvenient. If the connection of the joiner sleeves 120 to the end connectors 70 is to be performed in the field, such as on an oil rig, a nonwelded connection which can be made using simple tools may be preferable to a welded connection, since welding in the field may be difficult. In the present embodiment, each lengthwise end of each joiner sleeve 120 is attached by screws 122 to an attachment ring 123 which is attached in advance to the outer periphery of the sleeve 71 of one of the end connectors 70 in a fluidtight manner, such as by welding, press fit, shrink fit, or other method. A sealing member 124, such as an O-ring, a V-seal, a packing, or a gasket may be disposed between the outer periphery of the attachment ring 123 and the inner periphery of the joiner sleeve 120 to prevent particles large enough to be removed by the filter bodies 20 from flowing into the space 121 defmed by the joiner sleeve 120. In the illustrated embodiment, each sealing member 124 comprises an O-ring housed in a circumferentially extending groove formed in the attachment ring 123. Because the joiner sleeves 120 are sealed to the attachment rings 123 by the sealing members 124 and the attachment rings 123 are sealed to the end connectors 70 by welding, the sealing members 75 of the end connectors 70 adjoining the space 121 defined by the joiner sleeve 120 may be omitted, if desired.

It is possible to omit the attachment rings 123 and to attach the joiner sleeves 120 directly to the end connectors 70. However, use of the attachment rings 123 makes it unnecessary to cut any holes in the end connectors 70 which could weaken them and also makes it possible for the joiner sleeves 120 to have an easner diameter large enough for them to easily slide over the filter bodies 20 during assembly.

The inner support members 10 of the series of filters can translate with respect to the filter bodies 20 without any leakage of unfiltered fluid into the inner support members 10 until the uppermost perforation 12 in the inner support members 10 translates to above the sealing member 75 of the upper end connector 70 of the uppermost filter in the series. To increase the distance by which the inner support members 10 can translate, the inner support member 10 of the uppermost filter in the series may be formed without perforations, as shown in FIG. 23, in which case the inner support members 10 can safely translate by the distance D2 in the figure without any leakage occurring. This distance can be greater than the length of a single inner support member 10, which may be upwards of 20 feet. If the uppermost inner support member 10 has no perforations, the uppermost filter body 20 will not perform filtration unless the perforations 12 of the next lower filter in the series translate to the space surrounded by the uppermost filter body 20. Alternatively, the inner support member 10 of the uppermost filter may have perforations 12 which are spaced farther from its upper end connector 70 than is the case for the other filters in the series, in which case the uppermost filter body 20 can still perform filtration.

FIGS. 24 and 25 illustrate another example of a joiner sleeve 130 for connecting the end connectors 70 of two adjoining filters, FIG. 24 being a longitudinal cross-sectional view of one lengthwise end of the joiner sleeve 130 and FIG. 25 being an exploded cross-sectional view. The joiner sleeve 130 is a rigid cylindrical member secured to the end connectors 70 of adjoining filters. Only one lengthwise end of the joiner sleeve 130 is shown. The other lengthwise end may be the same in structure as the illustrated lengthwise end. Each lengthwise end of the joiner sleeve 130 surrounds an attachment ring 133 which surrounds the sleeve 71 of an end connector 70 and is secured to the sleeve 71 in a fluidtight manner, such as by welding. Adjoining its lengthwise end surface, the joiner sleeve 130 has an enlarged cylindrical bore 131 which receives a V-seal 135, which forms a seal between the attachment ring 133 and the bore 131 around the entire inner circumference of the bore 131. The V-seal 135 may be of conventional structure, or it may be equipped with a gasket material on its legs like the V-seal illustrated in FIG. 13. The V-seal 135 is retained inside the bore 131 by a retaining ring 136 which is disposed between the outer periphery of the attachment ring 133 and the inner periphery of the bore 131 of the joiner sleeve 130. The joiner sleeve 130 is prevented from lengthwise movement by one or more suitable securing members such as radially extending screws 138 which engage with preformed holes 132, 137, and 134 in the joiner sleeve 130, the retaining ring 136, and the attachment ring 133, respectively, which can be aligned with one another. One or more of the holes (such as hole 137 in the retaining ring 136) can be threaded to secure the screws 138 in place, while the other holes (such as holes 132 and 134) may have a clearance fit with respect to the screws 138 for ease of assembly. The V-seal 135 forms a seal which prevents particles large enough to be removed by the filter body 20 from flowing into the space surrounded by the joiner seal 130. Because the retaining ring 136 and the screws 138 are separated from the space within the joiner sleeve 130 by the V-seal 135, there is no danger of undesired particles entering this space, even if fluid can flow along the holes 132 and 137 which receive the screws 138 or along the inner or outer periphery of the retaining ring 136. Therefore, the retaining ring 136 may fit loosely between the joiner sleeve 130 and the attachment ring 133.

If it is desired to secure the attachment ring 133 to the sleeve 71 of the end connector 70 by welding, the welding can be performed at the time the end connector 70 is assembled and in a convenient location, such as in a factory. The attachment of the joiner sleeve 130 to the attachment ring 133 does not require welding, so the attachment can be easily performed in the field using simple tools. The joiner sleeve 130 of FIGS. 24 and 25 can be employed in the same manner as the joiner sleeve 120 of FIG. 23.

FIG. 26 is a longitudinal cross-sectional view of a lengthwise end of another example of a joiner sleeve 150 for connecting the end connectors 140 of adjoining filters to each other. The illustrated end connector 140 to which the joiner sleeve 150 is connected comprises a simple sleeve having circumferentially extending steps 141 formed on its inner lengthwise end for supporting a filter body 20, but it may have the same structure as various of the embodiments of end connectors described above. A pair of circumferentially extending grooves 142 are formed in the outer surface of the end connector 140 near its outer lengthwise end, and each groove 142 receives a corresponding ring 151 and 152. The rings 151 and 152 may be solid rings which fit around the end connector 140 by a press fit or shrink fit, for example, or they may be split rings which can be expanded to enable them to be easily fit around the end connector 140. The joiner sleeve 150 surrounds the rings 151 and 152, and a V-seal 153 is disposed between the rings 151 and 152 in the space between the outer periphery of the end connector 140 and the inner periphery of the joiner sleeve 150. The V-seal 153 is sealed against the outer periphery of the end connector 140 and the inner periphery of the joiner sleeve 150. The structure of the V-seal 153 may be conventional, or it may include a gasket material on its legs like the V-seal illustrated in FIG. 13. The joiner sleeve 150 is prevented from lengthwise movement with respect to the end connector 140 by a gland nut 154 which screws into threads formed in the inner periphery of the joiner sleeve 150 and/or the outer periphery of ring 151. To prevent the gland nut 154 from coming loose during installation of the filters in a well, the gland nut 154 may be tack welded to the joiner sleeve 150 or other member, or it may be equipped with an anti-rotation mechanism, such as a thread-locking device (an upset thread, a polymer locking button, etc.) or a tab which can be deformed into locking engagement with a recess or other portion of the joiner sleeve 150. The unillustrated opposite lengthwise end of the joiner sleeve 150 may be connected to an end connector of another filter in a similar manner. This embodiment is particularly easy to assemble in the field because it does not require any welding and there are no small parts such as pins or screws to handle.

Because the V-seal 153 prevents undesired particles from entering the space surrounded by the joiner sleeve 150, the end connector 140 itself is not equipped with any sealing members, but if desired, it can be provided with a sealing arrangement, such as that used for the end connectors 70 of FIG. 24, to provide additional protection against ingress of undesired particles.

The sealing member used to prevent undesired particles from entering the space surrounded by the joiner sleeve 150 is not restricted to any particular type of sealing member. FIG. 27 illustrates a modification of the joiner sleeve 150 of FIG. 26 using an O-ring 155 instead of a V-seal 153 as a sealing member. The structure of this example is otherwise identical to that of the example of FIG. 26. The joiner sleeves 150 of FIGS. 26 and 27 can be used in the same manner as the joiner sleeves 120 of FIG. 23.

It is not necessary for there to be a filter body 20 at the upper end of a joiner sleeve 120. FIG. 28 shows an embodiment of the present invention in which the upper end of a joiner sleeve 120 like those illustrated in FIG. 23 is supported by and sealingly connected to an end connector 70, but there is no filter body 20 attached to the end connector 70. The end connector 70 is mounted on an unperforated pipe 15 connected in series with the inner support member of a filter. The end connector 70 may have any structure which enables the pipe 15 and the inner support member 10 to move with respect to the end connector 70 under an axial force smaller than a level which can damage the end connector 70, the joiner sleeve 120, or the filter(s) connected in series with the pipe 15. In the present embodiment, the end connector 70 has the same structure as the end connector of FIG. 1 1A. The length of the joiner sleeve 120 is chosen so that the maximum expected movement of the inner support members 10 with respect to the filter bodies 20 will be less than distance D3, which is the distance from the perforations 12 in the uppermost inner support member 10 to the sealing member 75 of the uppermost end connector 70 when the filters are initially assembled. This embodiment may be otherwise the same as the embodiment of FIG. 23.

The various features of the present invention described above with respect to specific embodiments are not restricted to use with those embodiments, and the features of different embodiments can be used together in a wide variety of combinations.

What is claimed is:

1. A filter for subterranean use comprising:

an inner support member capable of transporting a fluid in an axial direction thereof;

a filter body disposed around the inner support member and including a filter medium; and an end connector disposed around the inner support member and including a fiber metal sealing member forming a seal against an outer surface of the inner support member.

2. A filter comprises a stopping member engaging an outer surface of the inner support member, and first and second sleeves connected to each other and surrounding the inner support member, one of the sleeves fitting over the stopping member, the first sleeve having a stopping surface opposing the stopping member, the stopping member overlapping the stopping surface in a radial direction of the inner support member to block lengthwise movement of the first sleeve.

3. A filter as claimed in claim 2 wherein the stopping member comprises a ball disposed in a recess in the outer surface of the inner support member.

4. A filter as claimed in claim 3 including a plurality of stopping members, each comprising a ball disposed in a recess in the outer surface of the inner support member.

5. A filter as claimed in claim 4 including a retainer coupled to the balls and maintaining a spacing between the balls in a circumferential direction of the inner support member.

6. A filter as claimed in claim 4 wherein each of the balls is received in a separate recess.

7. A filter as claimed in claim 4 wherein a plurality of the balls are disposed in a common recess.

8. A filter as claimed in claim 2 wherein the stopping member comprises a ring extending around a periphery of the inner support member and disposed in a recess in the outer surface of the inner support member.

9. A filter as claimed in claim 8 wherein the ring comprises a split ring.

10. A filter as claimed in claim 8 wherein the ring has a circular transverse cross section.

11. A filter as claimed in claim 8 wherein the ring includes a relieved portion for facilitating flexing of the ring.

12. A filter as claimed in claim 2 wherein the stopping surface of the first sleeve is nonperpendicular to an axis of the inner support member.

13. A filter as claimed in claim 12 wherein the stopping surface is sloped by at most approximately 15 degrees with respect to an axis of the inner support member as measured in a plane containing the axis.

14. A filter as claimed in claim 12 wherein the stopping surface is frustoconical.

15. A filter as claimed in claim 2 wherein the second sleeve has a stopping surface opposing the stopping member, the stopping member overlapping the stopping surface of the second sleeve in the radial direction of the inner support member to block lengthwise movement of the second sleeve.

16. A filter as claimed in claim 15 wherein at least one of the stopping surfaces is arranged to directly contact the stopping member.

17. A filter as claimed in claim 15 wherein the sealing member is disposed between the stopping surface of the second sleeve and the stopping member for transmitting compressive force between the stopping surface of the second sleeve and the stopping member.

18. A filter as claimed in claim 17 wherein the sealing member is compressed between the stopping surface of the second sleeve and the stopping member.

19. A filter as claimed in claim 18 wherein the stopping surface of the second sleeve is shaped to exert a radially inward force when pressed against the sealing member.

20. A filter as claimed in claim 19 wherein the stopping surface of the second sleeve is wedge-shaped and projects into the sealing member.

21. A filter as claimed in claim 2 wherein the first and second sleeves are nested with respect to each other.

22. A filter as claimed in claim 2 wherein the first sleeve includes a first axially-extending bore surrounding the inner support member and a second axially-extending bore connecting the first bore with the stopping surface and having a larger inner diameter than the first bore and defining a relief space.

23. A filter as claimed in claim 22 wherein the second bore is sufficiently large to enable the stopping member to enter the second bore without the filter body being disconnected from the end connector.

24. A filter as claimed in claim 1 wherein the end connector includes an annular V-seal surrounding the inner support member.

25. A filter as claimed in claim 24 wherein the V-seal has first and second legs, and a space between the legs faces away from the filter body.

26. A filter as claimed in claim 24 wherein the V-seal has first and second legs, and the sealing member is disposed on the first leg and pressed against the inner support member by the first leg.

27. A filter as claimed in claim 26 wherein the sealing member fills a space between legs of the V-seal.

28. A filter as claimed in claim 1 including two V-seals disposed around the inner support member, a space between legs of the one V-seal facing a space between the legs of the other V-seal, the sealing member filling the space between the legs of the two V-seals.

29. A filter as claimed in claim 28 wherein the sealing member is compressed between the V-seals.

30. A filter as claimed in claim 29 wherein the end connector includes a retaining ring nested inside the sleeve and exerting an axially compressive force on the V-seals and the packing.

31. A filter as claimed in claim 1 wherein the inner support member has a recess in an outer surface thereof and the end connector comprises a first sleeve surrounding the inner support member and having an engaging portion resiliently engaging the recess to resist axial movement of the first sleeve with respect to the inner support member, the engaging portion resiliently deforming without breaking to disengage from the recess when an axial force on the first sleeve exceeds a prescribed force.

32. A filter as claimed in claim 31 wherein the engaging portion comprises a lip extending around a lengthwise end of the first sleeve and projecting radially inwards towards the inner support member.

33. A filter as claimed in claim 32 wherein the lengthwise end of the first sleeve includes an axially extending slit formed therein to increase the flexibility of the lengthwise end.

34. A filter as claimed in claim 32 including a spring surrounding the first sleeve and urging the engaging portion towards the recess.

35. A filter as claimed in claim 34 wherein the spring comprises a wave-shaped spring surrounding the first sleeve.

36. A filter as claimed in claim 34 including a second sleeve surrounding the first sleeve, the spring being compressed between the first and second sleeves.

37. A filter as claimed in claim 1 wherein the end connector comprises a first sleeve surrounding the inner support member, a second sleeve surrounding the inner support member and secured to the first sleeve, and a ring surrounding the inner support member between the first and second sleeves and pressed radially inward towards the inner support member by one of the first and second sleeves and pressing the sealing member against the inner support member.

38. A filter as claimed in claim 37 wherein the ring has a sloping end surface which is sloped with respect to the inner support member, and one of the first and second rings has a sloping surface pressed against the sloping end surface of the ring.

39. A filter as claimed in claim 37 wherein the ring is substantially impervious to fluid.

40. A filter as claimed in claim 1 wherein the fiber metal comprises metal fiber s wh ich are mechanically interlocked with each other.

41. A filter as claimed in claim 40 wherein the metal fibers are not sintered to each other.

42. A filter as claimed in claim 40 wherein the metal fibers are lightly sintered to each other.

43. A filter as claimed in claim 40 wherein the fibers comprise stainless steel fibers.

44. A filter as claimed in claim 40 wherein the fibers have a fiber diameter of 2 to 200 micrometers.

45. A filter as claimed in claim 40 wherein the fibers have an initial voids volume prior to installation in the range of 20 to 80%.

46. A filter as claimed in claim 1 wherein the se aling member comprises a fiber metal strip spirally wound around itself to form an annulus.

47. A filter as claimed in claim 46 wherein the fiber metal strip is wound around itself in a plurality of turns, and adjoining turns are tack welded to each other.

48. A filter for subterranean use comprising:
an inner support member capable of transporting a fluid in an axial direction thereof;
a filter body disposed around the inner support member and including a filter medium; and
an end connector disposed around the inner support member and connected to a lengthwise end of the filter body and comprising a sleeve slidably disposed around the inner support member and a metallic sealing member in sliding contact with the inner support member and forming a seal between the sleeve and the inner support member.

49. A filter for subterranean use comprising:
an inner support member capable of transporting a fluid in an axail direction thereof;
a filter body disposed around the inner support and including a filter medium; and
an end connector disposed around the inner support member and connected to a lenthwise end of the filter body and comprising a sleeve slibably disposed around the inner support member and an annular fiber metal packing compressed between an inner surface of the sleeve and an outer surface of the inner support member.

50. A filter as claimed in cliam 49 wherein the packing is compressed in a lenthwise direction of the inner support member.

51. A filter as claimed in claim 50 including a second sleeve surrounding the inner support member, the packing being compressed between the first and second sleeves in a lengthwise direction of the inner support member.

52. A filter as claimed in cliam 51 wherein the first and second sleeves are nested with respect to each other.

53. A filter as claimed in cliam 51 wherein at least one of the first and second sleeves includes a sloping surface which is sloped with respect to the inner support member so as to exert a radially inward force on the packing.

54. A filter as claimed in claim 51 wherein one of the first and second sleeves has a wage-shaped surface which projects into the packing.

55. A filter as claimed in claim 51 including a compressible force applying member disposed in a space between the packing and one of the sleeves for extending an axially compressive force on the packing.

56. A filter as claimed in claim 55 wherein the force applying member comprises a spring.

57. A filter as claimed in claim 56 wherein the force applying member comprises a Belleville washer surrounding the inner support member.

58. A filter as claimed in claim 56 wherein the force applying member comprises a wave spring surrounding the inner support member.

59. A filter as claimed in claim 55 wherein the force applying member comprises a material having a cofficient of thermal expansion such that a compressive force exerted on the packing by the force applying member increases with temperature.

60. A filter assembly comprising:
a first filter comprising a first inner support member capable of transporting a fluid in an axial direction thereof and having a lengthwise end, a first filter body disposed around the first inner support member and including a filter medium, and a first end connector sealed to a lengthwise end of the first filter body and disposed around the first inner support member;
a second filter comprising a second inner support member capable of transporting a fluid in an axial direction thereof and having a lengthwise end joined to the lengthwise end of the first inner support member, a second filter body disposed around the second inner support member and including a filter medium, and a second end connector sealed to a lengthwise end of the second filter body and disposed around the second inner support member; and
a first sleeve extending from the first end connector to the second end connector and sealed to the first and second end connectors to prevent particles large enough to be removed by the filter bodies from flowing between the first sleeve and the first and second end connectors.

61. A filter assembly as claimed in claim 60 wherein the first end connector includes a sealing member which can slide with respect to the first inner support member while maintaining a seal between the first end connector and the first inner support member.

62. A filter assembly as claimed in claim 61 wherein the sealing member is metallic.

63. A filter assembly as claimed in claim 61 wherein the sealing member comprises an annular fiber metal packing.

64. A filter assembly as claimed in claim 63 wherein the first end connector comprises a second sleeve slidably disposed around the first inner support member, and the packing is compressed between an inner surface of the second sleeve and an outer surface of the first inner support member.

65. A filter assembly as claimed in claim 64 wherein the packing is compressed in a lengthwise direction of the first inner support member.

66. A filter assembly as claimed in claim 65 wherein the first end connector includes a third sleeve surrounding the first inner support member, the packing being compressed between the second and third sleeves in a lengthwise direction of the first inner support member.

67. A filter assembly as claimed in claim 66 wherein the second and third sleeves are nested with respect to each other.

68. A filter assembly as claimed in claim 66 wherein at least one of the second and third sleeves includes a sloping surface which is sloped with respect to the first inner support member so as to exert a radially inward force on the packing.

69. A filter assembly as claimed in claim 66 wherein one of the second and third sleeves has a wedge-shaped surface which projects into the packing.

70. A filter assembly as claimed in claim 66 including a compressible force applying member disposed in a space between the packing and one of the second and third sleeves for exerting an axially compressive force on the packing.

71. A filter assembly as claimed in claim 70 wherein the force applying member comprises a spring.

72. A filter assembly as claimed in claim 70 wherein the force applying member comprises a Belleville washer surrounding the inner support member.

73. A filter assembly as claimed in claim 70 wherein the force applying member comprises a wave spring surrounding the inner support member.

74. A filter assembly as claimed in claim 70 wherein the force applying member comprises a material having a coefficient of thermal expansion such that a compressive force exerted on the packing by the force applying member increases with temperature.

75. A filter assembly as claimed in claim 60 wherein the first sleeve comprises a rigid cylinder.

76. A filter assembly as claimed in claim 60 wherein the inner support members are joined to each other by flush joint threads.

* * * * *